(12) United States Patent
Wenren et al.

(10) Patent No.: US 12,078,869 B2
(45) Date of Patent: Sep. 3, 2024

(54) OPTICAL IMAGING LENS ASSEMBLY

(71) Applicant: ZHEJIANG SUNNY OPTICS CO.,LTD., Zhejiang (CN)

(72) Inventors: Jianke Wenren, Zhejiang (CN); Yuhao Wang, Zhejiang (CN); Fujian Dai, Zhejiang (CN); Liefeng Zhao, Zhejiang (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 456 days.

(21) Appl. No.: 17/298,041

(22) PCT Filed: Oct. 10, 2019

(86) PCT No.: PCT/CN2019/110246
§ 371 (c)(1),
(2) Date: May 28, 2021

(87) PCT Pub. No.: WO2020/164247
PCT Pub. Date: Aug. 20, 2020

(65) Prior Publication Data
US 2022/0099925 A1    Mar. 31, 2022

(30) Foreign Application Priority Data

Feb. 12, 2019   (CN) .......................... 201910111204.5

(51) Int. Cl.
G02B 9/62    (2006.01)
G02B 13/00   (2006.01)

(52) U.S. Cl.
CPC ........... *G02B 9/62* (2013.01); *G02B 13/0045* (2013.01)

(58) Field of Classification Search
CPC ...... G02B 9/62; G02B 13/0045; G02B 13/18; G02B 15/1461
See application file for complete search history.

(56) References Cited

U.S. PATENT DOCUMENTS

2015/0131167 A1    5/2015  Park et al.
2017/0108665 A1*   4/2017  Huang .................. G02B 13/02
(Continued)

FOREIGN PATENT DOCUMENTS

CN    107515455 A    12/2017
CN    107817594 A     3/2018
(Continued)

OTHER PUBLICATIONS

Corresponding CN first search report issued on Jan. 5, 2024.

*Primary Examiner* — Mustak Choudhury
*Assistant Examiner* — K Muhammad
(74) *Attorney, Agent, or Firm* — Samson G. Yu

(57) ABSTRACT

An optical imaging lens assembly sequentially includes, from an object side to an image side along an optical axis, a first lens (E1), second lens (E2), third lens (E3), fourth lens (E4), fifth lens (E5) and sixth lens (E6) with refractive power. The first lens (E1) has a positive refractive power, and an image-side surface (S2) of the first lens is a concave surface. The second lens (E2) has a negative refractive power. The fifth lens (E5) has a negative refractive power, and an object-side surface (S9) of the fifth lens is a concave surface. A distance TTL from an object-side surface (S1) of the first lens (E1) to an imaging surface (S15) of the optical imaging lens assembly and a total effective focal length f of the optical imaging lens assembly satisfy TTL/f≤0.85.

18 Claims, 16 Drawing Sheets

(56) References Cited

U.S. PATENT DOCUMENTS

| | | | |
|---|---|---|---|
| 2017/0299847 A1* | 10/2017 | Huang | G02B 13/18 |
| 2019/0011672 A1* | 1/2019 | Nitta | G02B 13/0045 |
| 2019/0121061 A1* | 4/2019 | Jung | G02B 7/04 |
| 2019/0265438 A1* | 8/2019 | Sekine | G02B 7/021 |
| 2020/0192067 A1* | 6/2020 | Chen | G02B 13/0045 |
| 2020/0409042 A1* | 12/2020 | Teranishi | G02B 13/0045 |
| 2021/0063689 A1* | 3/2021 | Xu | G02B 13/18 |

FOREIGN PATENT DOCUMENTS

| | | | | |
|---|---|---|---|---|
| CN | 208367314 U | | 1/2019 | |
| CN | 109298508 A | * | 2/2019 | G02B 13/0045 |
| CN | 109298508 A | | 2/2019 | |
| CN | 208477184 A | | 2/2019 | |
| CN | 109613683 A | | 4/2019 | |

\* cited by examiner

OPTICAL IMAGING LENS ASSEMBLY

CROSS-REFERENCE TO RELATED APPLICATION(S)

The disclosure is a national stage application of International Patent Application No. PCT/CN2019/110246, which is filed on Oct. 10, 2019 and claims priority to and benefit of Chinese Patent Application No. 201910111204.5, filed to the China National Intellectual Property Administration (CNIPA) on Feb. 12, 2019, the disclosure of which is hereby incorporated by reference in its entirety.

TECHNICAL FIELD

The disclosure relates to an optical imaging lens assembly, and more particularly to an optical imaging lens assembly including six lenses.

BACKGROUND

With the progress of sciences and technologies, portable electronic products such as smart phones and tablet computers have developed rapidly and imaging requirements of users on photographing with smart phones have also increased constantly. Cameras of portable electronic products are developed from single cameras to multiple cameras. At present, a combined wide-angle and telephoto manner is usually adopted for most of high-end lenses to realize an optical zooming function. However, a telephoto lens usually has the problem of excessive Total Track Length (TTL), and this is inconsistent with a present development trend of portable electronic products to ultra-thin designs. Therefore, how to ensure a telephoto feature of a lens and simultaneously reduce a total optical length of the lens is a problem urgent to be solved at present.

SUMMARY

The disclosure provides an optical imaging lens assembly, for example, a telephoto short lens, applicable to a portable electronic product and capable of at least overcoming or partially overcoming at least one shortcoming in a art known to inventors.

Some implementation modes of the disclosure provide an optical imaging lens assembly, which sequentially includes, from an object side to an image side along an optical axis, a first lens, a second lens, a third lens, a fourth lens, a fifth lens and a sixth lens with refractive powers. The first lens has a positive refractive power, and an image-side surface of the first lens is a concave surface. The second lens has a negative refractive power. The fifth lens has a negative refractive power.

In an implementation mode, an object-side surface of the fifth lens is a concave surface.

In an implementation mode, a distance TTL from an object-side surface of the first lens to an imaging surface of the optical imaging lens assembly on the optical axis and a total effective focal length f of the optical imaging lens assembly satisfy $TTL/f \leq 0.85$.

In an implementation mode, an effective focal length f2 of the second lens and an effective focal length f3 of the third lens satisfy $0.9 < (f3+f2)/(f3-f2) < 1.4$.

In an implementation mode, an effective focal length f1 of the first lens and the total effective focal length f of the optical imaging lens assembly satisfy $0.2 < f1/f < 0.7$.

In an implementation mode, the total effective focal length f of the optical imaging lens assembly, an effective focal length f4 of the fourth lens and an effective focal length f5 of the fifth lens satisfy $0.2 < f/(f5-4) < 0.7$.

In an implementation mode, a combined focal length f1234 of the first lens, the second lens, the third lens and the fourth lens and a combined focal length f56 of the fifth lens and the sixth lens satisfy $-0.8 < f1234/f56 < -0.3$.

In an implementation mode, a radius of curvature R1 of an object-side surface of the first lens, a radius of curvature R2 of the image-side surface of the first lens, a radius of curvature R3 of an object-side surface of the second lens and a radius of curvature R4 of an image-side surface of the second lens satisfy $0.3 < (R3+R4)/(R1+R2) < 0.8$.

In an implementation mode, a radius of curvature R5 of an object-side surface of the third lens and a radius of curvature R6 of an image-side surface of the third lens satisfy $0.7 < R6/R5 < 1.2$.

In an implementation mode, a radius of curvature R7 of an object-side surface of the fourth lens and a radius of curvature R8 of an image-side surface of the fourth lens may meet $0.1 < (R7-R8)/(R7+R8) < 0.6$.

In an implementation mode, a radius of curvature R9 of the object-side surface of the fifth lens and a radius of curvature R12 of an image-side surface of the sixth lens satisfy $0.2 < R12/R9 < 0.7$.

In an implementation mode, a center thickness CT1 of the first lens on the optical axis, a center thickness CT5 of the fifth lens on the optical axis and a center thickness CT6 of the sixth lens on the optical axis satisfy $0.5 < CT1/(CT5+CT6) < 1$.

In an implementation mode, a spacing distance T12 of the first lens and the second lens on the optical axis and a spacing distance T34 of the third lens and the fourth lens on the optical axis satisfy $0.5 < T12/T34 < 1$.

In an implementation mode, a spacing distance T23 of the second lens and the third lens on the optical axis, a spacing distance T45 of the fourth lens and the fifth lens on the optical axis and a spacing distance T56 of the fifth lens and the sixth lens on the optical axis satisfy $0.1 < T56/(T23+T45) < 0.6$.

In an implementation mode, an axial distance SAG52 from an intersection point of an image-side surface of the fifth lens and the optical axis to an effective radius vertex of the image-side surface of the fifth lens and an axial distance SAG62 from an intersection point of an image-side surface of the sixth lens and the optical axis to an effective radius vertex of the image-side surface of the sixth lens satisfy $0.3 < SAG52/SAG62 < 0.8$.

In an implementation mode, an edge thickness ET1 of the first lens and an edge thickness ET5 of the fifth lens satisfy $0.5 < ET1/ET5 < 0.8$.

In an implementation mode, a maximum effective radius DT31 of an object-side surface of the third lens, a maximum effective radius DT61 of an object-side surface of the sixth lens and a sum $\Sigma AT$ of a spacing distance of any two adjacent lenses in the first lens to the sixth lens on the optical axis satisfy $1.2 < (DT31+DT61)/\Sigma AT < 1.4$.

In an implementation mode, a maximum semi-field of view (Semi-FOV) of the optical imaging lens assembly satisfy $0° < Semi\text{-}FOV < 25°$.

In an implementation mode, an object-side surface of the fourth lens is a convex surface, while the image-side surface is a concave surface.

In an implementation mode, an image-side surface of the fifth lens is a concave surface.

In an implementation mode, an object-side surface of the sixth lens is a concave surface.

According to the disclosure, the six lenses are adopted, and the refractive power and surface types of each lens, the center thickness of each lens, axial distances between the lenses and the like are reasonably configured to achieve at least one beneficial effect of ultra-thin design, high resolution, low cost and the like of the optical imaging lens assembly.

BRIEF DESCRIPTION OF THE DRAWINGS

Detailed descriptions are made to unrestrictive implementation modes below in combination with the drawings to make the other characteristics, purposes and advantages of the disclosure more apparent. In the drawings.

DETAILED DESCRIPTION OF THE EMBODIMENTS

Figure 1:
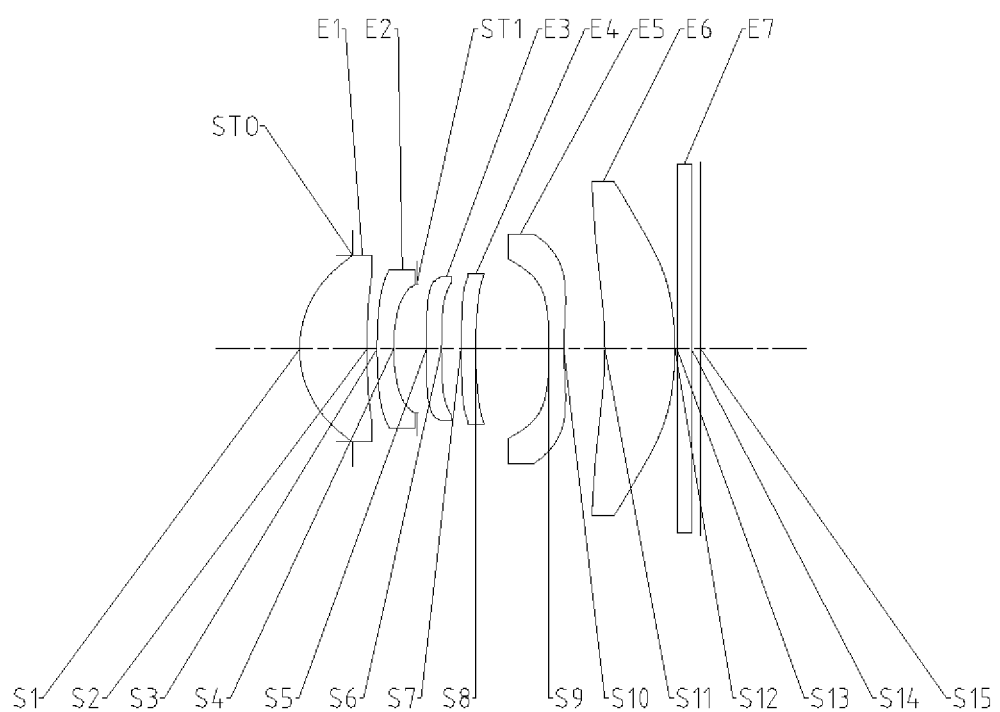
FIG. 1 is a structure diagram of an optical imaging lens assembly according to embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, etc. are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspherical shape shown in the drawings is shown by some embodiments. That is, the spherical shape or the aspherical shape is not limited to the spherical shape or aspherical shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, closest to a shot object, of each lens is called an object-side surface of the lens, and a surface, closest to an imaging surface, of each lens is called an image-side surface of the lens.

It should also be understood that terms "include", "including", "have", "contain" and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It should also be understood that the terms (for example, terms defined in a common dictionary) should be explained to have meanings consistent with the meanings in the context of a related art and may not be explained with ideal or excessively formal meanings, unless clearly defined like this in the disclosure.

The embodiments in the present disclosure and characteristics in the embodiments can be combined without conflicts. The disclosure will be described below with reference to the drawings and in combination with examples in detail. The characteristics, principles and other aspects of the disclosure will be described below in detail.

An optical imaging lens assembly according to some implementation modes of the disclosure includes, for example, six lenses with refractive power, i.e., a first lens, a second lens, a third lens, a fourth lens, a fifth lens and a sixth lens. The six lenses are sequentially arranged from an object side to an image side along an optical axis. In the first lens to the sixth lens, there is an air space between any two adjacent lenses.

In some exemplary implementation modes, the first lens has a positive refractive power, and an image-side surface thereof is a concave surface; the second lens has a negative refractive power; the third lens has a positive refractive power or a negative refractive power; the fourth lens has a positive refractive power or a negative refractive power; the fifth lens has a negative refractive power; and the sixth lens has a positive refractive power or a negative refractive power. The image-side surface of the first lens with the positive refractive power is a concave surface, so that external light is converged in the optical system better, and a luminous flux is increased. The second lens with negative refractive power improves various optical aberrations brought by the first lens and deflects light to be matched with a Chief Ray Angle (CRA) of a chip better to increase a focal length of the system. The third and fourth lenses with refractive power improve the degree of freedom of the assembly, balance the aberration of the system and improve the overall performance of the system. The fifth lens with negative refractive power further increases the focal length of the lens assembly, corrects higher-order aberrations formed by the first four lenses, balance curvature fields and distortions and improves the Modulation Transfer Function (MTF) performance. The sixth lens with refractive power improves the relative luminance of the system, controls off-focus values of different FOVs, achieves a better shooting effect of the system, converges light beams and plays a decisive role in controlling edge distortions.

In some exemplary implementation modes, an object-side surface of the fourth lens is a convex surface, while an image-side surface is a concave surface; an image-side surface of the fifth lens is a concave surface; and an object-side surface of the sixth lens is a concave surface. Surface types of the fourth lens, the fifth lens and the sixth lens are reasonably configured to effectively control deflection of light, match the CRA of the lens assembly with the chip better, balance each major aberration, improve the system performance and achieve a telephoto feature of a camera lens at the same time of ensuring a high-quality shooting effect.

In some exemplary implementation modes, an object-side surface of the first lens is a convex surface; an object-side surface of the second lens is a convex surface, while an image-side surface of the second lens is a concave surface; an object-side surface of the third lens is a convex surface, while an image-side surface of the third lens is a concave surface; the fourth lens has a negative refractive power; an object-side surface of the fifth lens is a concave surface; and an image-side surface of the sixth lens is a convex surface.

In some exemplary implementation modes, the optical imaging lens assembly of the disclosure satisfies a conditional expression $TTL/f \leq 0.85$, wherein TTL is a distance from an object-side surface of the first lens to an imaging surface of the optical imaging lens assembly on the optical axis, and f is a total effective focal length of the optical imaging lens assembly. More specifically, TTL and f further satisfies $0.83 \leq TTL/f \leq 0.85$. Controlling the relational expression is favorable for implementing a telephoto short lens with a telephoto feature and a relatively small total optical length.

In some exemplary implementation modes, the optical imaging lens assembly of the disclosure satisfies a conditional expression $0° < \text{Semi-FOV} < 25°$, wherein Semi-FOV is a maximum Semi-FOV of the optical imaging lens assembly. In some implementation modes, Semi-FOV further satisfies $20.8° \leq \text{Semi-FOV} \leq 21.3°$. The relational expression is controlled to ensure that the focal length of the optical lens assembly reaches a certain value to achieve the telephoto feature and ensure higher relative luminance of the lens assembly to meet shooting requirements of a user in different environments.

In some exemplary implementation modes, the optical imaging lens assembly of the disclosure satisfies a conditional expression $0.2 < f1/f < 0.7$, wherein f1 is an effective focal length of the first lens, and f is the total effective focal length of the optical imaging lens assembly. In some implementation modes, f1 and f further satisfy $0.4 < f1/f < 0.5$, for example, $0.45 \leq f1/f \leq 0.46$. The relational expression is controlled to balance a contribution value of the first lens to the focal length, reduce the sensitivity of the whole assembly and achieve a higher capability of the optical imaging lens assembly in balancing the curvature field.

In some exemplary implementation modes, the optical imaging lens assembly of the disclosure satisfies a conditional expression $0.9 < (f3+f2)/(f3-f2) < 1.4$, wherein f2 is an effective focal length of the second lens, and f3 is an effective focal length of the third lens. In some implementation modes, f2 and f3 further satisfy $0.97 \leq (f3+f2)/(f3-f2) \leq 1.24$. The relational expression may be controlled to reduce a deflection angle of the light, thereby reducing the sensitivity of the assembly and also enabling the optical assembly to match the CRA of the chip better.

In some exemplary implementation modes, the optical imaging lens assembly of the disclosure satisfies a conditional expression $0.2 < f/(f5-f4) < 0.7$, wherein f is the total effective focal length of the optical imaging lens assembly, f4 is an effective focal length of the fourth lens, and f5 is an effective focal length of the fifth lens. In some exemplary implementation modes, f, f4 and f5 further satisfy $0.33 \leq f/(f5-f4) \leq 0.52$. The relational expression is controlled to enable the assembly to match a common chip easily, effectively control deflection of the light and reduce a rear-end size of the optical assembly.

In some exemplary implementation modes, the optical imaging lens assembly of the disclosure satisfies a conditional expression $-0.8 < f1234/f56 < -0.3$, wherein f1234 is a combined focal length of the first lens, the second lens, the third lens and the fourth lens, and f56 is a combined focal length of the fifth lens and the sixth lens. In some exemplary implementation modes, f1234 and f56 satisfy $-0.68 \leq f1234/f56 \leq -0.47$. The relational expression may be controlled to effectively reduce a distortion of an edge of the optical imaging lens assembly, ensure relative luminance of the edge and achieve a better imaging effect.

In some exemplary implementation modes, the optical imaging lens assembly of the disclosure satisfies a conditional expression $0.3 < (R3+R4)/(R1+R2) < 0.8$, wherein R1 is a radius of curvature of an object-side surface of the first lens, R2 is a radius of curvature of an image-side surface of the first lens, R3 is a radius of curvature of an object-side surface of the second lens, and R4 is a radius of curvature of an image-side surface of the second lens. In some exemplary implementation modes, R1, R2, R3 and R4 may further meet $0.6 < (R3+R4)/(R1+R2) < 0.8$, for example, $0.69 \leq (R3+R4)/(R1+R2) \leq 0.73$. The relational expression is controlled to reduce the overall sensitivity of the system, enable the optical imaging lens assembly to balance the curvature field and the distortion easily, reduce a longitudinal aberration of the optical system, simultaneously increase an MTF value of an off-axis FOV (field of view) and meet a higher imaging requirement.

In some exemplary implementation modes, the optical imaging lens assembly of the disclosure may meet a conditional expression $0.7 < R6/R5 < 1.2$, wherein R5 is a radius of curvature of the object-side surface of the third lens, and R6 is a radius of curvature of the image-side surface of the third lens. In some exemplary implementation modes, f5 and R6 further satisfy $0.74 \leq f6/R5 \leq 1.05$. The relational expression is controlled to enable the optical imaging lens assembly to balance the curvature field and the distortion easily.

In some exemplary implementation modes, the optical imaging lens assembly of the disclosure satisfies a conditional expression $0.1<(R7-R8)/(R7+R8)<0.6$, wherein R7 is a radius of curvature of the object-side surface of the fourth lens, and R8 is a radius of curvature of the image-side surface of the fourth lens. More specifically, R7 and f8 may further satisfy $0.2<(R7-R8)/(R7+R8)<0.4$, for example, $0.28\le(R7-R8)/(R7+R8)\le0.31$. The relational expression is controlled to enable the optical assembly to match the CRA of the chip better.

In some exemplary implementation modes, the optical imaging lens assembly of the disclosure satisfies a conditional expression $0.2<R12/R9<0.7$, wherein R9 is a radius of curvature of an object-side surface of the fifth lens, and R12 is a radius of curvature of an image-side surface of the sixth lens. In some exemplary implementation modes, R9 and R12 may further satisfy $0.37\le R12/R9\le0.51$. The relational expression is controlled to achieve a relatively high astigmatism balancing capability of the optical imaging lens assembly.

In some exemplary implementation modes, the optical imaging lens assembly of the disclosure satisfies a conditional expression $0.5<CT1/(CT5+CT6)<1$, wherein CT1 is a center thickness of the first lens on the optical axis, CT5 is a center thickness of the fifth lens on the optical axis, and CT6 is a center thickness of the sixth lens on the optical axis. In some exemplary implementation modes, CT1, CT5 and CT6 may further satisfy $0.7<CT1/(CT5+CT6)<1$, for example, $0.79\le CT1/(CT5+CT6)\le0.91$. The relational expression is controlled to effectively ensure the machinability of the first, fifth and sixth lenses, achieve higher adaptation to a forming properties of a plastic lens, ensure stability in production and assembling and achieve a relatively high coma balancing capability of the optical imaging lens assembly.

In some exemplary implementation modes, the optical imaging lens assembly of the disclosure satisfies a conditional expression $0.5<T12/T34<1$, wherein T12 is a spacing distance of the first lens and the second lens on the optical axis, and T34 is a spacing distance of the third lens and the fourth lens on the optical axis. In some exemplary implementation modes, T12 and T34 further satisfy $0.52\le T12/T34\le0.71$. The relational expression is controlled to achieve a relatively high dispersion balancing capability of the optical assembly and ensure the feasibility of a dark matter processing process.

In some exemplary implementation modes, the optical imaging lens assembly of the disclosure satisfies a conditional expression $0.1<T56/(T23+T45)<0.6$, wherein T23 is a spacing distance of the second lens and the third lens on the optical axis, T45 is a spacing distance of the fourth lens and the fifth lens on the optical axis, and T56 is a spacing distance of the fifth lens and the sixth lens on the optical axis. In some exemplary implementation modes, T23, T45 and T56 may satisfy $0.2<T56/(T23+T45)<0.5$, for example, $0.36\le T56/(T23+T45)\le0.46$. The relational expression is controlled to achieve a relatively high dispersion balancing capability of the optical system, balance the aberration easily and improve the overall performance of the assembly.

In some exemplary implementation modes, the optical imaging lens assembly of the disclosure satisfies a conditional expression $0.3<SAG52/SAG62<0.8$, wherein SAG52 is an axial distance from an intersection point of an image-side surface of the fifth lens and the optical axis to an effective radius vertex of the image-side surface of the fifth lens, and SAG62 is an axial distance from an intersection point of an image-side surface of the sixth lens and the optical axis to an effective radius vertex of the image-side surface of the sixth lens. More specifically, SAG52 and SAG62 may further satisfy $0.46\le SAG52/SAG62\le0.67$. The relational expression is controlled to reasonably regulate the CRA of the assembly to effectively improve the relative luminance of the assembly and improve a resolution of an image surface.

In some exemplary implementation modes, the optical imaging lens assembly of the disclosure satisfies a conditional expression $0.5<ET1/ET5<0.8$, wherein ET1 is an edge thickness of the first lens, and ET5 is an edge thickness of the fifth lens. More specifically, ET1 and ET5 may further satisfy $0.61\le ET1/ET5\le0.76$. The relational expression is controlled to achieve a relatively high coma balancing capability of the optical system, reduce the sensitivity of the first and fifth lenses and ensure the stability of a forming process.

In some exemplary implementation modes, the optical imaging lens assembly of the disclosure satisfies a conditional expression $1.2<(DT31+DT61)/\Sigma AT<1.4$, wherein DT31 is a maximum effective radius of the object-side surface of the third lens, DT61 is a maximum effective radius of the object-side surface of the sixth lens, and $\Sigma AT$ is a sum of spacing distances of any two adjacent lenses in the first lens to the sixth lens on the optical axis. In some exemplary implementation modes, DT31, DT61 and $\Sigma AT$ further satisfy $1.29\le(DT31+DT61)/\Sigma AT\le1.33$. The relational expression is controlled to ensure a greater focal length of the lens, increase the F number, properly control a range of a depth of field and meet shooting requirements of more users.

In some exemplary implementation modes, the optical imaging lens assembly further includes an aperture diaphragm and a vignetting diaphragm. For example, the aperture diaphragm is arranged between the object side and the first lens. For example, the vignetting diaphragm is arranged between the second lens and the third lens.

In some exemplary implementation modes, the optical imaging lens assembly further includes an optical filter configured to correct a chromatic aberration and/or a protective glass configured to protect a photosensitive element on the imaging surface.

The optical imaging lens assembly according to the implementation modes of the disclosure may adopt multiple lenses, for example, the abovementioned six. The refractive power and surface types of each lens, the center thickness of each lens, axial distances between the lenses and the like are reasonably configured to effectively reduce the size of the imaging lens assembly, reduce the sensitivity of the imaging lens assembly, improve the machinability of the imaging lens assembly and ensure that the optical imaging lens assembly is more favorable for production and machining and applicable to a portable electronic product. The disclosure discloses a solution to a telephoto short lens. A manner of combining six lenses is adopted, so that more light information is collected, lower optical aberrations and higher imaging quality are ensured, high relative luminance and a small depth of field ensure that details of a photographic field are captured in an extreme environment, and better shooting experiences are brought to the user.

In some implementation modes of the disclosure, at least one of mirror surfaces of each lens is an aspherical mirror surface, namely at least one of the object-side surface and image-side surface of each lens in the first lens, the second lens, the third lens, the fourth lens, the fifth lens and the sixth lens is an aspherical mirror surface. An aspherical lens has a characteristic that a curvature keeps changing continuously from a center of the lens to a periphery of the lens. Unlike a spherical lens with a constant curvature from a center of the lens to a periphery of the lens, the aspherical lens has a better curvature radius characteristic and the advantages of improving distortions and improving astigmatic aberrations. With adoption of the aspherical lens, the astigmatic aberrations during imaging may be eliminated as much as possible, thereby improving the imaging quality. In some implementation modes, both the object-side surface and image-side surface of each lens in the first lens, the second lens, the third lens, the fourth lens, the fifth lens and the sixth lens are aspherical mirror surfaces.

However, those skilled in the art should know that the number of the lenses forming the optical imaging lens assembly may be changed without departing from the technical solutions claimed in the disclosure to achieve each result and advantage described in the specification. For example, although descriptions are made in the implementation with six lenses as an example, the optical imaging lens assembly is not limited to six lenses. If necessary, the optical imaging lens assembly may also include another number of lenses.

Specific embodiments of the optical imaging lens assembly applied to the abovementioned implementation mode will further be described below with reference to the drawings.

Embodiment 1

An optical imaging lens assembly according to embodiment 1 of the disclosure will be described below with reference to FIG. 1 to FIG. 2D. FIG. 1 is a structure diagram of an optical imaging lens assembly according to embodiment 1 of the disclosure.

As shown in FIG. 1, from an object side to an image side along an optical axis, the optical imaging lens assembly sequentially includes a diaphragm STO, a first lens E1, a second lens E2, a vignetting diaphragm ST1, a third lens E3, a fourth lens E4, a fifth lens E5, a sixth lens E6, an optical filter E7 and an imaging surface S15.

The first lens E1 has a positive refractive power, an object-side surface S1 of the first lens E1 is a convex surface, an image-side surface S2 of the first lens E1 is a concave surface. The second lens E2 has a negative refractive power, an object-side surface S3 thereof is a convex surface, while an image-side surface S4 is a concave surface. The third lens E3 has a negative refractive power, an object-side surface S5 thereof is a convex surface, while an image-side surface S6 is a concave surface. The fourth lens E4 has a negative refractive power, an object-side surface S7 thereof is a convex surface, while an image-side surface S8 is a concave surface. The fifth lens E5 has a negative refractive power, an object-side surface S9 thereof is a concave surface, while an image-side surface S10 is a concave surface. The sixth lens E6 has a positive refractive power, an object-side surface S11 thereof is a concave surface, while an image-side surface S12 is a convex surface. The optical filter E7 has an object-side surface S13 and an image-side surface S14. Light from an object sequentially penetrates through each of the surfaces S1 to S14 and is finally imaged on the imaging surface S15.

Table 1 is a basic parameter table of the optical imaging lens assembly of embodiment 1, and units of the radius of curvature, the thickness and the focal length are all millimeter (mm).

TABLE 1

Embodiment 1: f = 6.75 mm, f/EPD = 2.53, Semi-FOV = 21.3°, ImgH = 2.67 mm

| Surface number | Surface type | Radius of curvature | Thickness | Refractive index | Abbe number | Focal length | Conic coefficient |
|---|---|---|---|---|---|---|---|
| OBJ | Spherical | Infinite | Infinite | | | | |
| STO | Spherical | Infinite | −0.7607 | | | | |
| S1 | Aspherical | 1.5016 | 0.9652 | 1.55 | 56.1 | 3.09 | −0.1592 |
| S2 | Aspherical | 10.4925 | 0.1449 | | | | −4.6173 |
| S3 | Aspherical | 6.3016 | 0.2355 | 1.68 | 19.2 | −5.86 | 21.3006 |
| S4 | Aspherical | 2.3986 | 0.3346 | | | | 3.5073 |
| ST1 | Spherical | Infinite | 0.1365 | | | | |
| S5 | Aspherical | 12.0025 | 0.2176 | 1.68 | 19.2 | −78.12 | 38.1963 |
| S6 | Aspherical | 9.7122 | 0.2798 | | | | 9.5695 |
| S7 | Aspherical | 11.2863 | 0.2100 | 1.55 | 56.1 | −27.07 | 99.0000 |
| S8 | Aspherical | 6.3574 | 1.0500 | | | | 18.2215 |
| S9 | Aspherical | −13.0780 | 0.2132 | 1.55 | 56.1 | −6.57 | 98.5705 |
| S10 | Aspherical | 4.9731 | 0.5892 | | | | −33.8270 |
| S11 | Aspherical | −6.0362 | 1.0028 | 1.67 | 20.3 | 36.40 | −33.8270 |
| S12 | Aspherical | −5.1547 | 0.0300 | | | | −10.0000 |
| S13 | Spherical | Infinite | 0.2100 | 1.52 | 64.2 | | |
| S14 | Spherical | Infinite | 0.1297 | | | | |
| S15 | Spherical | Infinite | 0.0000 | | | | |

Herein, f is a total effective focal length of the optical imaging lens assembly, EPD is an entrance pupil diameter of the optical imaging lens assembly, Semi-FOV is a maximum Semi-FOV of the optical imaging lens assembly, and ImgH is a half of a diagonal length of an effective pixel region on the imaging surface.

In embodiment 1, both the object-side surface and image-side surface of any lens in the first lens E1 to the sixth lens E6 are aspherical surfaces, and a surface type x of each aspherical lens is defined through, but not limited to, the following aspherical surface formula:

$$x = \frac{ch^2}{1 + \sqrt{1 - (k+1)c^2h^2}} + \sum A_i h^i, \quad (1)$$

wherein x is a distance vector height from a vertex of the aspherical surface when the aspherical surface is at a height of h along the optical axis direction; c is a paraxial curvature of the aspherical surface, c=1/R (namely, the paraxial curvature c is a reciprocal of the radius of curvature R in Table 1); k is a conic coefficient; and Ai is a correction coefficient of the i-th order of the aspherical surface. Table 2 shows higher-order coefficients A4, A6, A8, A10, A12, A14, A16, A18 and A20 that can be used for each of the aspherical mirror surfaces S1-S16 in embodiment 1.

TABLE 2

| Surface number | A4 | A6 | A8 | A10 | A12 |
|---|---|---|---|---|---|
| S1 | 6.4800E−03 | −1.2569E−02 | 6.5813E−02 | −1.7110E−01 | 2.6966E−01 |
| S2 | 1.2961E−02 | 1.2828E−02 | 9.8735E−03 | −3.7803E−02 | −6.4575E−03 |
| S3 | −4.5599E−02 | 1.6591E−01 | −3.6636E−01 | 1.1992E+00 | −2.8928E+00 |
| S4 | −7.6905E−02 | 4.2672E−01 | −2.2815E+00 | 1.0693E+01 | −2.9182E+01 |
| S5 | −4.2388E−02 | 1.0441E−01 | −2.8304E−01 | 2.1834E+00 | −6.4020E+00 |
| S6 | 3.2864E−02 | −1.3567E−01 | 9.4035E−01 | −2.8065E+00 | 8.1478E+00 |
| S7 | 7.7033E−02 | −5.0300E−01 | 1.3051E+00 | −2.6506E+00 | 4.9086E+00 |
| S8 | 6.1315E−02 | −2.8754E−01 | 2.7377E−01 | 3.0724E−01 | −9.8342E−01 |
| S9 | −1.5306E−01 | 1.6384E−01 | −4.5416E−01 | 6.3430E−01 | −6.2050E−01 |
| S10 | −9.9774E−02 | 1.5142E−01 | −2.8964E−01 | 2.9079E−01 | −1.7555E−01 |
| S11 | −6.1604E−02 | 9.2568E−02 | −7.3939E−02 | 3.7593E−02 | −1.2734E−02 |
| S12 | −6.5648E−02 | 3.6134E−02 | −2.0280E−02 | 6.8242E−03 | −7.2436E−04 |

| Surface number | A14 | A16 | A18 | A20 |
|---|---|---|---|---|
| S1 | −2.5619E−01 | 1.4271E−01 | −4.2287E−02 | 4.9735E−03 |
| S2 | 9.7384E−02 | −1.2791E−01 | 6.8116E−02 | −1.3184E−02 |
| S3 | 4.2927E+00 | −3.7811E+00 | 1.8027E+00 | −3.5489E−01 |
| S4 | 4.6012E+01 | −3.8625E+01 | 1.3254E+01 | 2.3605E−01 |
| S5 | 1.0464E+01 | −9.9214E+00 | 4.7702E+00 | −7.6560E−01 |
| S6 | −1.6866E+01 | 2.2141E+01 | −1.6896E+01 | 5.6358E+00 |
| S7 | −6.1453E+00 | 4.7242E+00 | −2.1232E+00 | 4.3515E−01 |
| S8 | 1.0374E+00 | −2.9771E−01 | −2.2728E−01 | 1.2409E−01 |
| S9 | 4.1394E−01 | −1.8015E−01 | 4.7307E−02 | −5.6342E−03 |
| S10 | 6.3489E−02 | −1.2533E−02 | 1.0050E−03 | 6.8646E−06 |
| S11 | 2.8689E−03 | −4.1114E−04 | 3.3713E−05 | −1.1988E−06 |
| S12 | −2.0602E−04 | 7.4209E−05 | −8.8033E−06 | 3.7733E−07 |

Figure 2A:
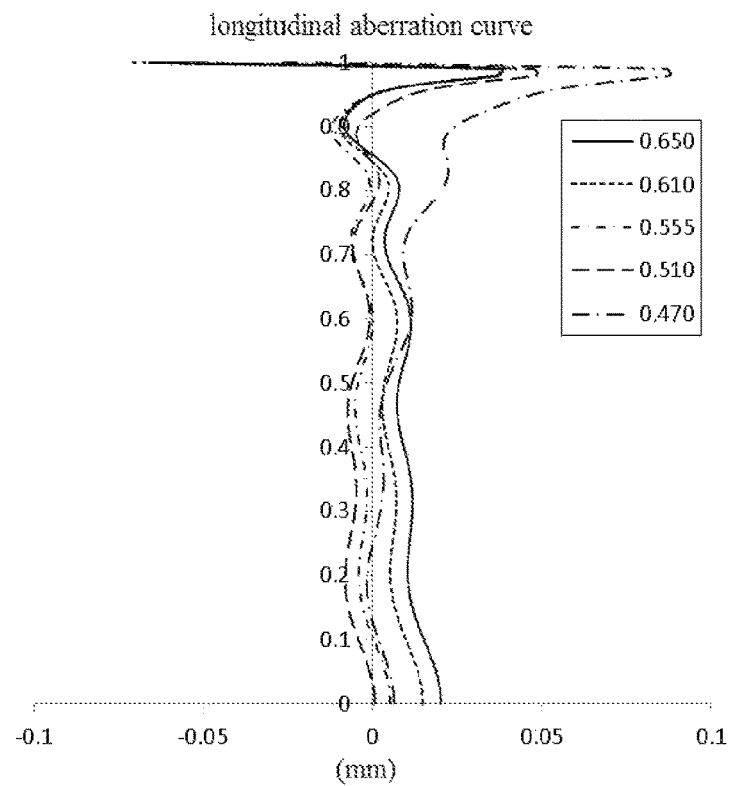
FIG. 2A to FIG. 2D illustrate a longitudinal aberration curve, astigmatism curve, distortion curve and lateral color curve of an optical imaging lens assembly according to embodiment 1 respectively.
Figure 2B:
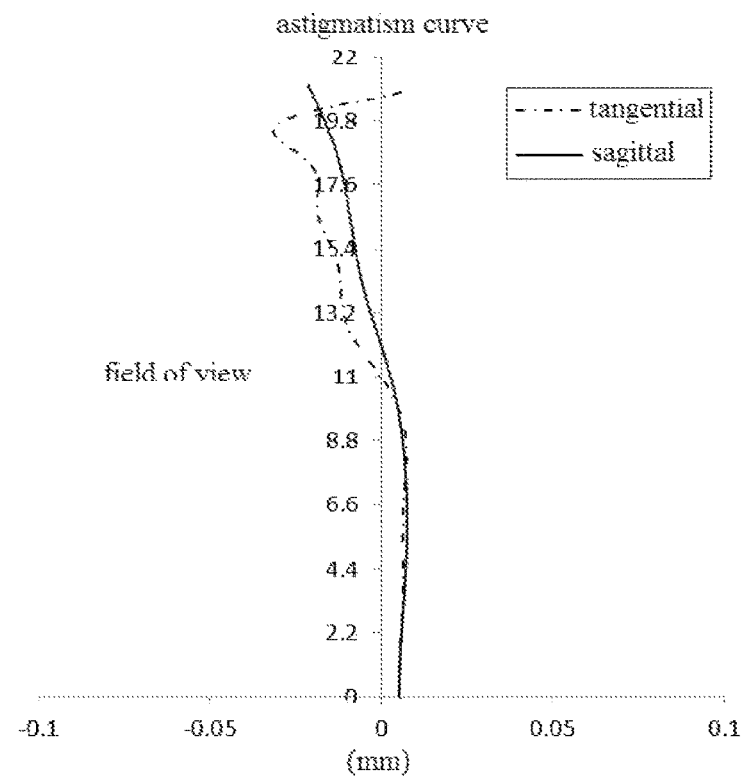
Figure 2C:
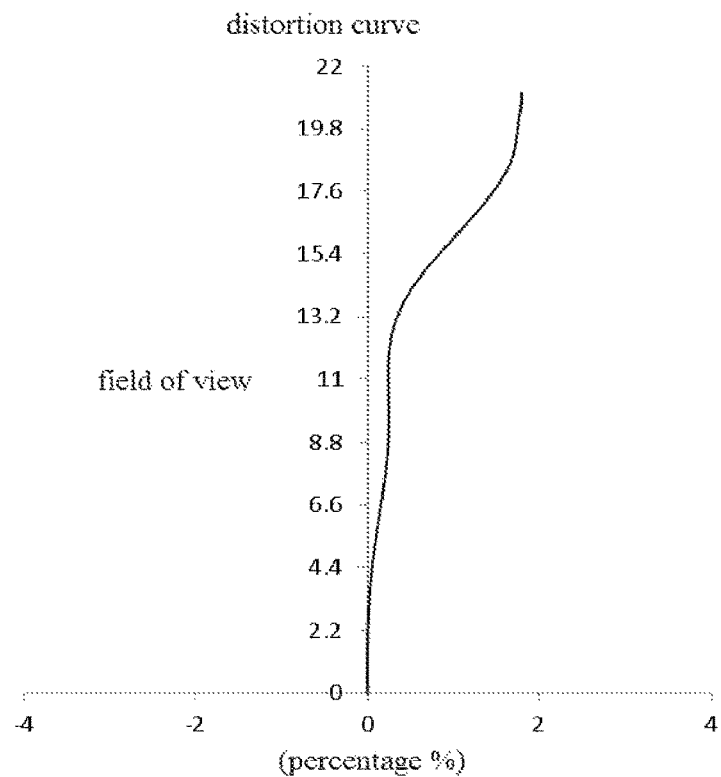
Figure 2D:
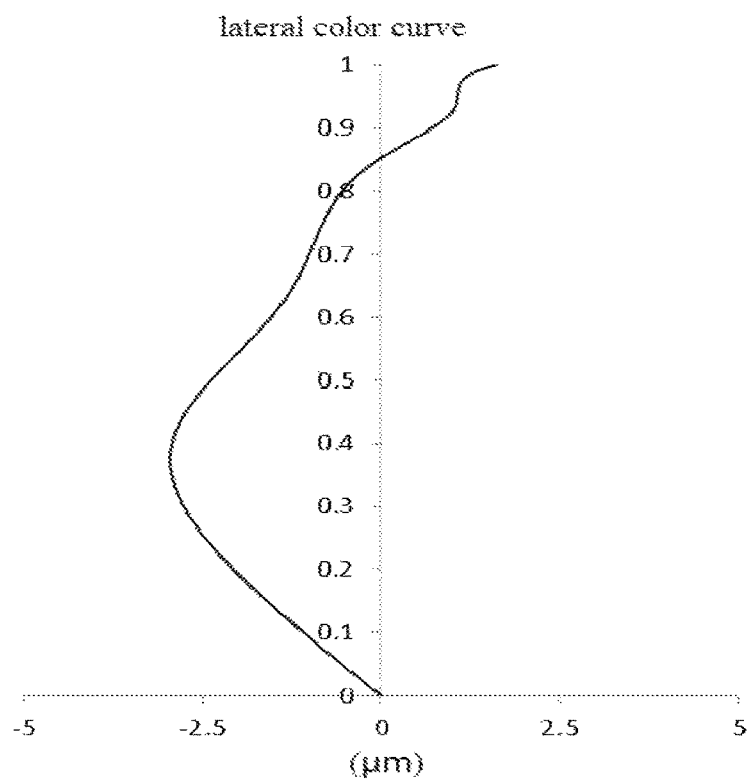

FIG. 2A illustrates a longitudinal aberration curve of the optical imaging lens assembly according to embodiment 1 to represent deviation of a convergence focal point after light with different wavelengths passes through the lens. FIG. 2B illustrates an astigmatism curve of the optical imaging lens assembly according to embodiment 1 to represent a tangential image surface curvature and a sagittal image surface curvature. FIG. 2C illustrates a distortion curve of the optical imaging lens assembly according to embodiment 1 to represent distortion values under different FOVs. FIG. 2D illustrates a lateral color curve of the optical imaging lens assembly according to embodiment 1 to represent deviation of different image heights on the imaging surface after the light passes through the lens. According to FIG. 2A to FIG. 2D, it can be seen that the optical imaging lens assembly provided in embodiment 1 achieves high imaging quality.

Embodiment 2

Figure 3:
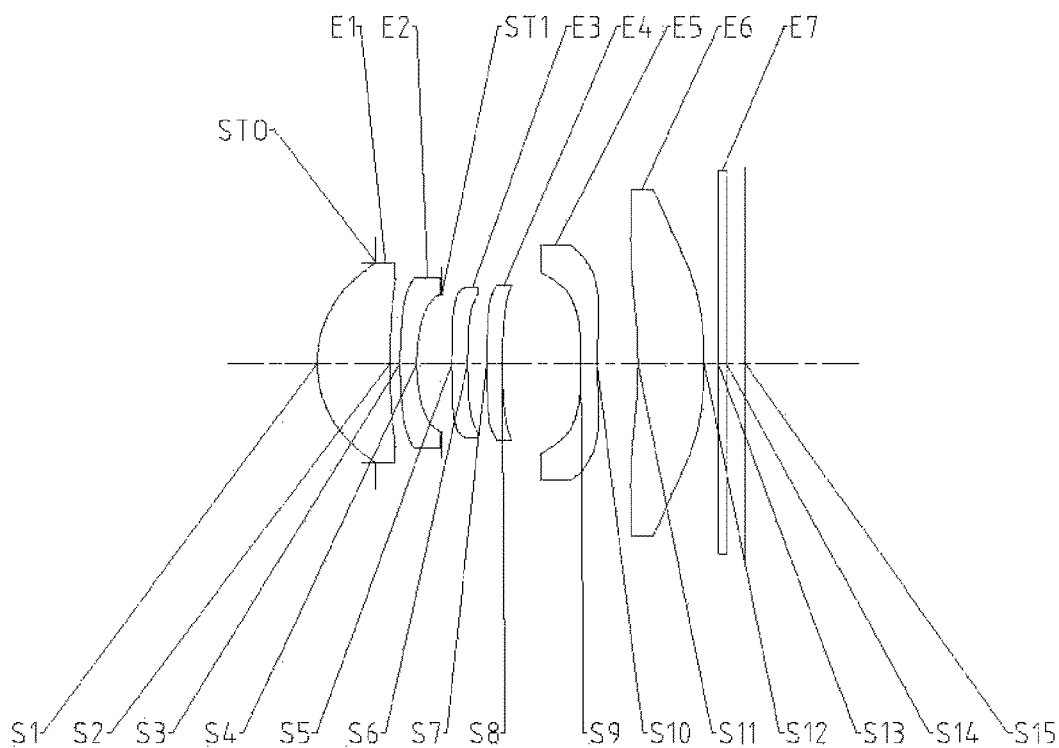
FIG. 3 is a structure diagram of an optical imaging lens assembly according to embodiment 2 of the disclosure.

An optical imaging lens assembly according to embodiment 2 of the disclosure will be described below with reference to FIG. 3 to FIG. 4D. In the embodiment and the following embodiments, part of descriptions similar to those about embodiment 1 are omitted for simplicity. FIG. 3 is a structure diagram of an optical imaging lens assembly according to embodiment 2 of the disclosure.

As shown in FIG. 3, the optical imaging lens assembly sequentially includes, from an object side to an image side along an optical axis, a diaphragm STO, a first lens E1, a second lens E2, a vignetting diaphragm ST1, a third lens E3, a fourth lens E4, a fifth lens E5, a sixth lens E6, an optical filter E7 and an imaging surface S15.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a negative refractive power, an object-side surface S5 thereof is a convex surface, while an image-side surface S6 is a concave surface. The fourth lens E4 has a negative refractive power, an object-side surface S7 thereof is a convex surface, while an image-side surface S8 is a concave surface. The fifth lens E5 has a negative refractive power, an object-side surface S9 thereof is a concave surface, while an image-side surface S10 is a concave surface. The sixth lens E6 has a positive refractive power, an object-side surface S11 thereof is a concave surface, while an image-side surface S12 is a convex surface. The optical filter E7 has an object-side surface S13 and an image-side surface S14. Light from an object sequentially penetrates through each of the surfaces S1 to S14 and is finally imaged on the imaging surface S15.

Table 3 is a basic parameter table of the optical imaging lens assembly of embodiment 2, and units of the radius of curvature, the thickness and the focal length are all millimeter (mm). Table 4 shows high-order coefficients applied to each aspherical mirror surface in embodiment 2. A surface type of each aspherical surface is defined by formula (1) given in embodiment 1.

Figure 4A:
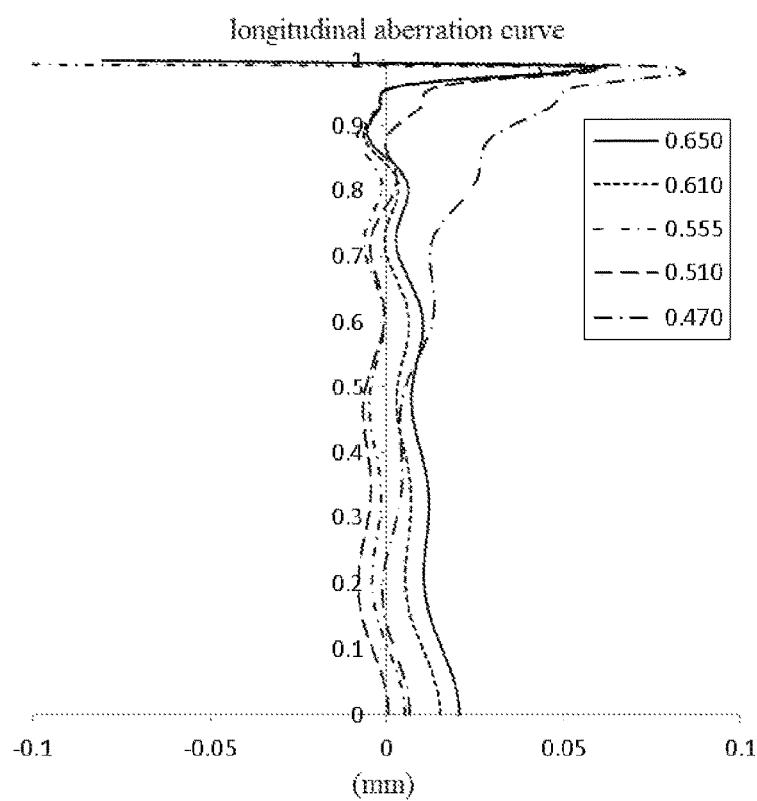
FIG. 4A to FIG. 4D illustrate a longitudinal aberration curve, astigmatism curve, distortion curve and lateral color curve of an optical imaging lens assembly according to embodiment 2 respectively.
Figure 4B:
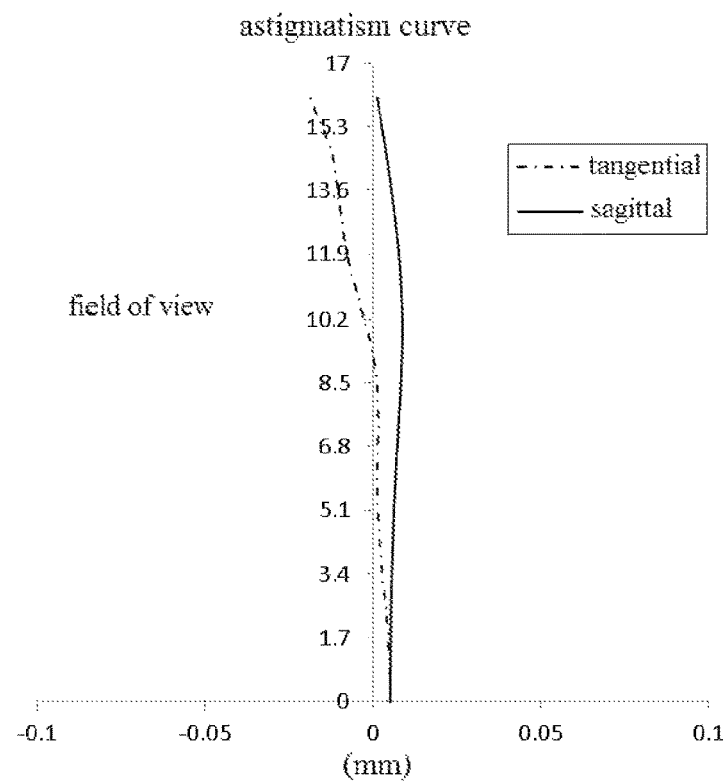
Figure 4C:
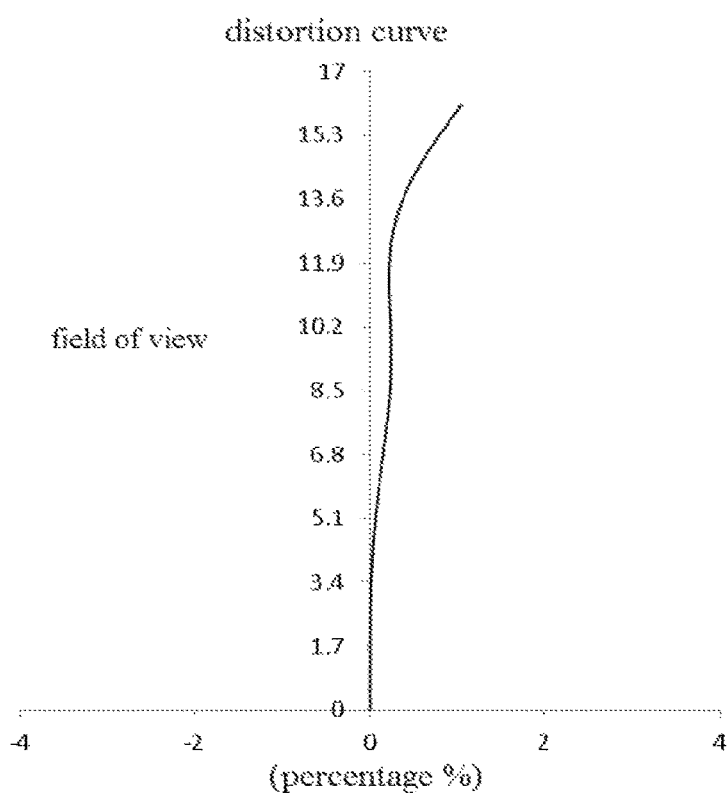
Figure 4D:
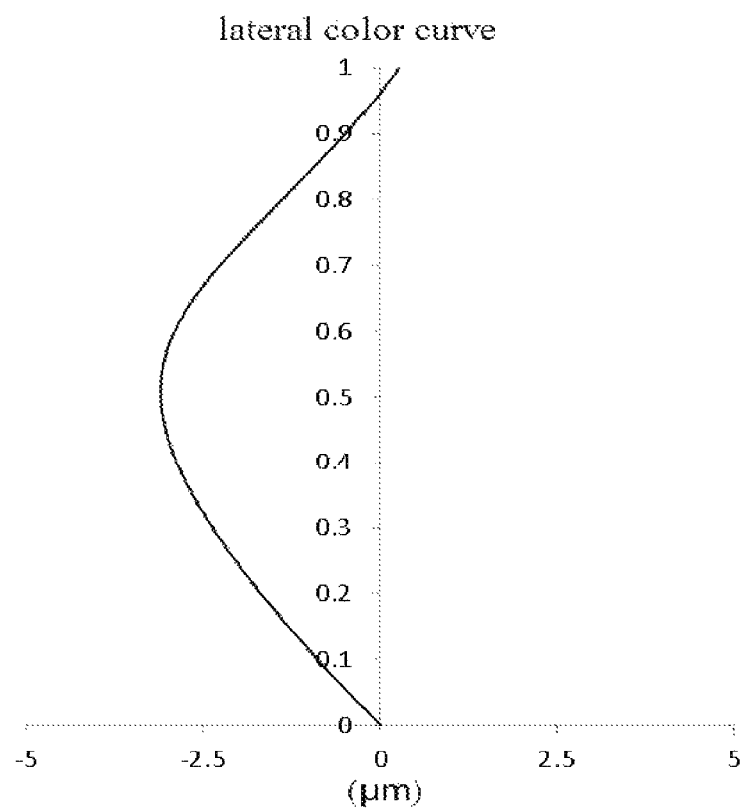

FIG. 4A illustrates a longitudinal aberration curve of the optical imaging lens assembly according to embodiment 2 to represent deviation of a convergence focal point after light with different wavelengths passes through the lens. FIG. 4B illustrates an astigmatism curve of the optical imaging lens assembly according to embodiment 2 to represent a tangential image surface curvature and a sagittal image surface curvature. FIG. 4C illustrates a distortion curve of the optical imaging lens assembly according to embodiment 2 to represent distortion values under different FOVs. FIG. 4D

TABLE 3

Embodiment 2: f = 6.85 mm, f/EPD = 2.53, Semi-FOV = 21.0°, ImgH = 2.67 mm

| Surface number | Surface type | Radius of curvature | Thickness | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7883 | | | | |
| S1 | Aspherical | 1.5015 | 0.9754 | 1.55 | 56.1 | 3.08 | −0.1566 |
| S2 | Aspherical | 10.7115 | 0.1359 | | | | −2.8948 |
| S3 | Aspherical | 6.3114 | 0.2280 | 1.68 | 19.2 | −5.95 | 21.9462 |
| S4 | Aspherical | 2.4230 | 0.3382 | | | | 3.5094 |
| ST1 | Spherical | Infinite | 0.1365 | | | | |
| S5 | Aspherical | 12.8428 | 0.2100 | 1.68 | 19.2 | −57.05 | 31.9074 |
| S6 | Aspherical | 9.5762 | 0.2533 | | | | 28.5760 |
| S7 | Aspherical | 11.0581 | 0.2100 | 1.55 | 56.1 | −24.43 | 97.5149 |
| S8 | Aspherical | 6.0048 | 1.0500 | | | | 20.4667 |
| S9 | Aspherical | −12.3848 | 0.2200 | 1.55 | 56.1 | −6.39 | 99.0000 |
| S10 | Aspherical | 4.8837 | 0.5493 | | | | −34.4045 |
| S11 | Aspherical | −6.7583 | 0.8925 | 1.67 | 20.3 | 36.22 | −75.0192 |
| S12 | Aspherical | −5.5587 | 0.1876 | | | | −10.0000 |
| S13 | Spherical | Infinite | 0.1100 | 1.52 | 64.2 | | |
| S14 | Spherical | Infinite | 0.1876 | | | | |
| S15 | Spherical | Infinite | 0.0647 | | | | |

TABLE 4

| Surface number | A4 | A6 | A8 | A10 | A12 |
|---|---|---|---|---|---|
| S1 | 6.6329E−03 | −1.3368E−02 | 6.7197E−02 | −1.6780E−01 | 2.5660E−01 |
| S2 | 1.2645E−02 | 1.2562E−02 | 1.1660E−02 | −4.6947E−02 | 2.0716E−02 |
| S3 | −4.4379E−02 | 1.5234E−01 | −3.1720E−01 | 1.0142E+00 | −2.3778E+00 |
| S4 | −6.9435E−02 | 3.2762E−01 | −1.3736E+00 | 5.2233E+00 | −9.3210E+00 |
| S5 | −3.7701E−02 | 1.3572E−01 | −8.1172E−01 | 4.5881E+00 | −1.2037E+01 |
| S6 | 3.4423E−02 | −1.1683E−02 | −4.4577E−01 | 4.0641E+00 | −1.1393E+01 |
| S7 | 7.9169E−02 | −5.3576E−01 | 1.4464E+00 | −2.8693E+00 | 5.2076E+00 |
| S8 | 5.4039E−02 | −4.2222E−01 | 1.2123E+00 | −3.1851E+00 | 7.1837E+00 |
| S9 | −1.4212E−01 | −4.5233E−02 | 4.7830E−02 | 6.2255E−02 | −3.2348E−01 |
| S10 | −6.6387E−02 | −7.1246E−02 | 1.7273E−01 | −2.3094E−01 | 1.9095E−01 |
| S11 | −1.1410E−02 | 7.6929E−03 | −2.6028E−03 | 2.5683E−03 | −1.4896E−03 |
| S12 | −3.5707E−02 | 8.2019E−03 | −5.1857E−03 | 1.0203E−03 | 9.8704E−04 |

| Surface number | A14 | A16 | A18 | A20 |
|---|---|---|---|---|
| S1 | −2.3817E−01 | 1.2992E−01 | −3.7617E−02 | 4.2887E−03 |
| S2 | 5.2088E−02 | −8.4998E−02 | 4.7152E−02 | −9.1326E−03 |
| S3 | 3.4399E+00 | −2.9619E+00 | 1.3802E+00 | −2.6493E−01 |
| S4 | 2.6633E+00 | 1.7133E+01 | −2.5577E+01 | 1.1497E+01 |
| S5 | 1.7855E+01 | −1.4847E+01 | 5.7577E+00 | −4.9196E−01 |
| S6 | 1.7352E+01 | −1.3787E+01 | 3.6110E+00 | 7.6646E−01 |
| S7 | −6.3240E+00 | 4.5948E+00 | −1.9080E+00 | 3.6032E−01 |
| S8 | −1.0983E+01 | 1.0464E+01 | −5.5422E+00 | 1.2270E+00 |
| S9 | 4.3162E−01 | −2.8468E−01 | 9.5114E−02 | −1.2676E−02 |
| S10 | −9.9618E−02 | 3.1767E−02 | −5.6415E−03 | 4.2494E−04 |
| S11 | 4.3725E−04 | −7.1500E−05 | 6.4553E−06 | −2.6012E−07 |
| S12 | −5.2031E−04 | 9.8654E−05 | −8.1816E−06 | 2.3571E−07 | illustrates a lateral color curve of the optical imaging lens assembly according to embodiment 2 to represent deviation of different image heights on the imaging surface after the light passes through the lens. According to FIG. 4A to FIG. 4D, it can be seen that the optical imaging lens assembly provided in embodiment 2 achieves high imaging quality.

Embodiment 3

Figure 5:
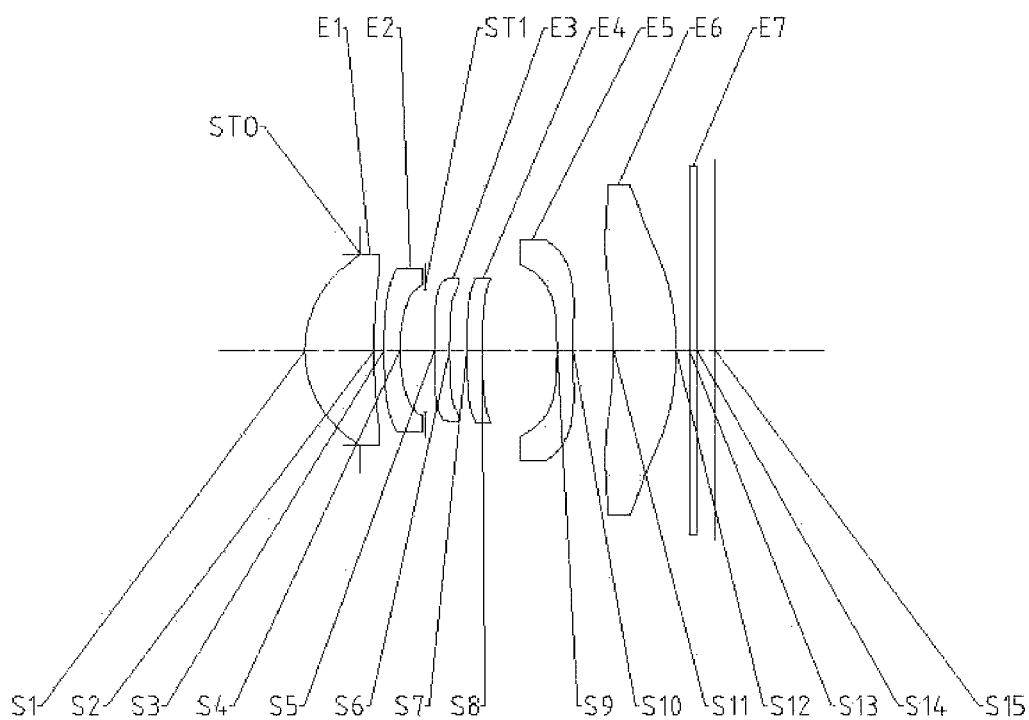
FIG. 5 is a structure diagram of an optical imaging lens assembly according to embodiment 3 of the disclosure.

An optical imaging lens assembly according to embodiment 3 of the disclosure will be described below with reference to FIG. 5 to FIG. 6D. FIG. 5 is a structure diagram of an optical imaging lens assembly according to embodiment 3 of the disclosure.

As shown in FIG. 5, the optical imaging lens assembly sequentially includes, from an object side to an image side along an optical axis, a diaphragm STO, a first lens E1, a second lens E2, a vignetting diaphragm ST1, a third lens E3, a fourth lens E4, a fifth lens E5, a sixth lens E6, an optical filter E7 and an imaging surface S15.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a negative refractive power, an object-side surface S5 thereof is a convex surface, while an image-side surface S6 is a concave surface. The fourth lens E4 has a negative refractive power, an object-side surface S7 thereof is a convex surface, while an image-side surface S8 is a concave surface. The fifth lens E5 has a negative refractive power, an object-side surface S9 thereof is a concave surface, while an image-side surface S10 is a concave surface. The sixth lens E6 has a positive refractive power, an object-side surface S11 thereof is a concave surface, while an image-side surface S12 is a convex surface. The optical filter E7 has an object-side surface S13 and an image-side surface S14. Light from an object sequentially penetrates through each of the surfaces S1 to S14 and is finally imaged on the imaging surface S15.

Table 5 is a basic parameter table of the optical imaging lens assembly of embodiment 3, and units of the radius of curvature, the thickness and the focal length are all millimeter (mm). Table 6 shows high-order coefficients applied to each aspherical mirror surface in embodiment 3. A surface type of each aspherical surface is defined by formula (1) given in embodiment 1.

TABLE 5

Embodiment 3: f = 6.82 mm, f/EPD = 2.53, Semi-FOV = 21.1°, ImgH = 2.67 mm

| Surface number | Surface type | Radius of curvature | Thickness | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7816 | | | | |
| S1 | Aspherical | 1.5015 | 0.9701 | 1.55 | 56.1 | 3.08 | −0.1559 |
| S2 | Aspherical | 10.8356 | 0.1369 | | | | −3.1082 |
| S3 | Aspherical | 6.3394 | 0.2268 | 1.68 | 19.2 | −5.90 | 22.0500 |
| S4 | Aspherical | 2.4170 | 0.3460 | | | | 3.5367 |
| ST1 | Spherical | Infinite | 0.1365 | | | | |
| S5 | Aspherical | 12.4049 | 0.2100 | 1.68 | 19.2 | −54.29 | 40.1001 |
| S6 | Aspherical | 9.2131 | 0.2455 | | | | 29.6560 |
| S7 | Aspherical | 10.5139 | 0.2100 | 1.55 | 56.1 | −24.26 | 97.4207 |
| S8 | Aspherical | 5.8194 | 1.0500 | | | | 21.3064 |
| S9 | Aspherical | −12.1258 | 0.2200 | 1.55 | 56.1 | −7.19 | 88.8797 |
| S10 | Aspherical | 5.8451 | 0.5745 | | | | −35.3102 |
| S11 | Aspherical | −5.2258 | 0.8729 | 1.67 | 20.3 | 31.50 | −48.7896 |
| S12 | Aspherical | −4.4637 | 0.1876 | | | | −10.0000 |
| S13 | Spherical | Infinite | 0.1100 | 1.52 | 64.2 | | |
| S14 | Spherical | Infinite | 0.1876 | | | | |
| S15 | Spherical | Infinite | 0.0647 | | | | |

TABLE 6

| Surface number | A4 | A6 | A8 | A10 | A12 |
|---|---|---|---|---|---|
| S1 | 6.7798E−03 | −1.3419E−02 | 6.7009E−02 | −1.6663E−01 | 2.5410E−01 |
| S2 | 1.2594E−02 | 1.2634E−02 | 1.1395E−02 | −4.6038E−02 | 1.8595E−02 |
| S3 | −4.4581E−02 | 1.5343E−01 | −3.2350E−01 | 1.0463E+00 | −2.4714E+00 |
| S4 | −6.9484E−02 | 3.2174E−01 | −1.2903E+00 | 4.7489E+00 | −7.9847E+00 |
| S5 | −3.3170E−02 | 3.8192E−02 | 5.1402E−02 | 2.9665E−01 | 1.3443E+00 |
| S6 | 3.6263E−02 | −6.0480E−02 | −4.4285E−02 | 2.0869E+00 | −4.4328E+00 |
| S7 | 7.3638E−02 | −5.0200E−01 | 1.2029E+00 | −1.7196E+00 | 2.3899E+00 |
| S8 | 5.6906E−02 | −5.4605E−01 | 2.2014E+00 | −7.4747E+00 | 1.8618E+01 |
| S9 | −1.3748E−01 | −9.8844E−02 | 2.2782E−01 | −2.8579E−01 | 1.2642E−01 |
| S10 | −7.5286E−02 | −1.0146E−01 | 2.6241E−01 | −3.4310E−01 | 2.7739E−01 |
| S11 | −1.3211E−02 | −7.1879E−03 | 1.9672E−02 | −9.2929E−03 | 1.5378E−03 |
| S12 | −3.1761E−02 | 6.5881E−04 | −2.5367E−03 | 2.8136E−03 | −3.4339E−04 |

TABLE 6-continued

| Surface number | A14 | A16 | A18 | A20 |
|---|---|---|---|---|
| S1 | −2.3495E−01 | 1.2751E−01 | −3.6667E−02 | 4.1327E−03 |
| S2 | 5.5134E−02 | −8.7591E−02 | 4.8375E−02 | −9.3756E−03 |
| S3 | 3.6017E+00 | −3.1242E+00 | 1.4672E+00 | −2.8408E−01 |
| S4 | 8.9294E−01 | 1.7804E+01 | −2.4938E+01 | 1.1019E+01 |
| S5 | −8.4971E+00 | 1.6760E+01 | −1.5232E+01 | 5.4067E+00 |
| S6 | 9.6065E−01 | 9.8642E+00 | −1.5039E+01 | 6.8720E+00 |
| S7 | −2.5594E+00 | 1.9463E+00 | −1.0993E+00 | 3.1762E−01 |
| S8 | −2.9912E+01 | 2.9344E+01 | −1.5886E+01 | 3.6086E+00 |
| S9 | 5.7903E−02 | −1.0443E−01 | 5.0287E−02 | −8.2928E−03 |
| S10 | −1.4368E−01 | 4.5839E−02 | −8.1329E−03 | 6.0742E−04 |
| S11 | 1.2044E−04 | −8.6296E−05 | 1.2678E−05 | −6.5229E−07 |
| S12 | −1.8298E−04 | 5.9107E−05 | −6.3858E−06 | 2.3910E−07 |

Figure 6A:
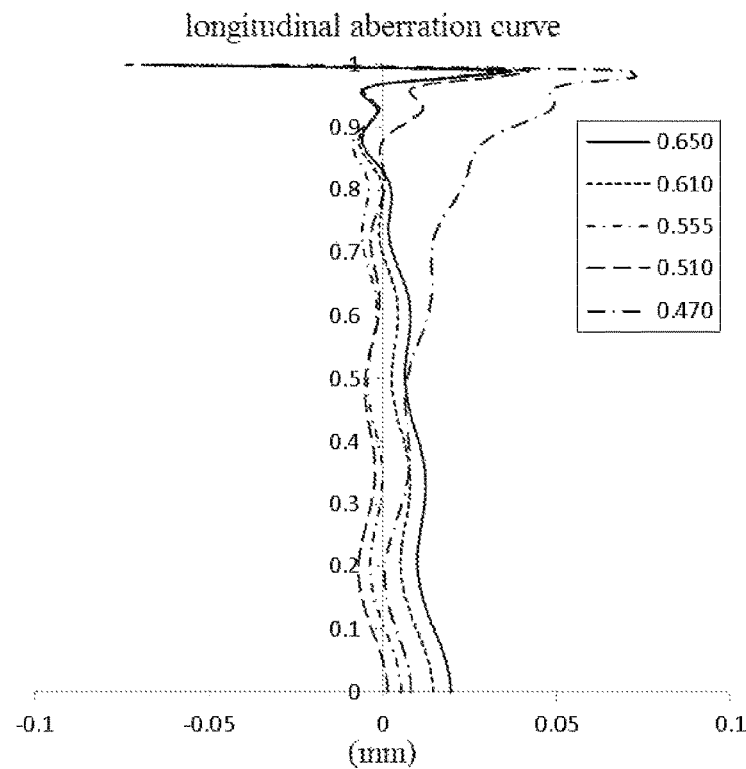
FIG. 6A to FIG. 6D illustrate a longitudinal aberration curve, astigmatism curve, distortion curve and lateral color curve of an optical imaging lens assembly according to embodiment 3 respectively.
Figure 6B:
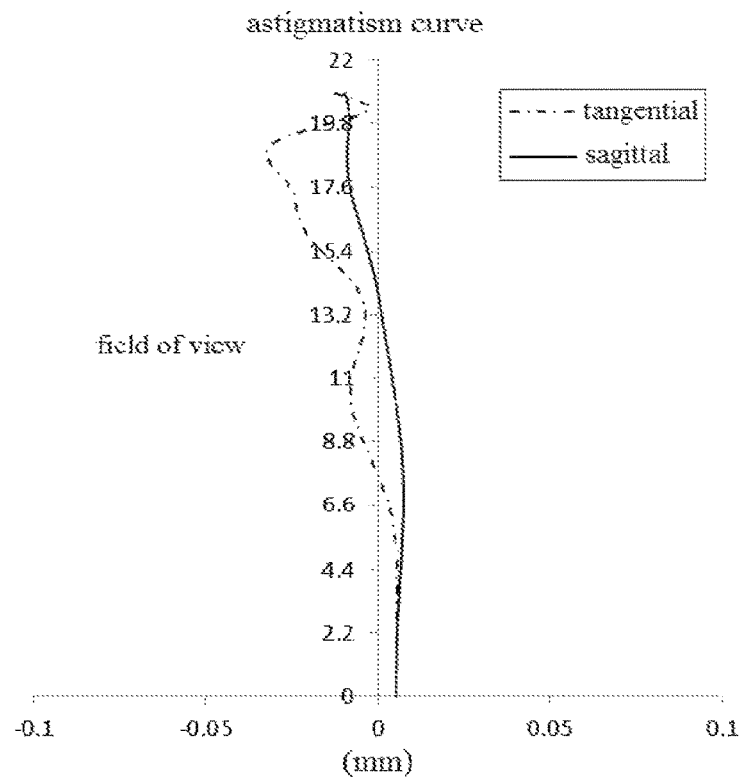
Figure 6C:
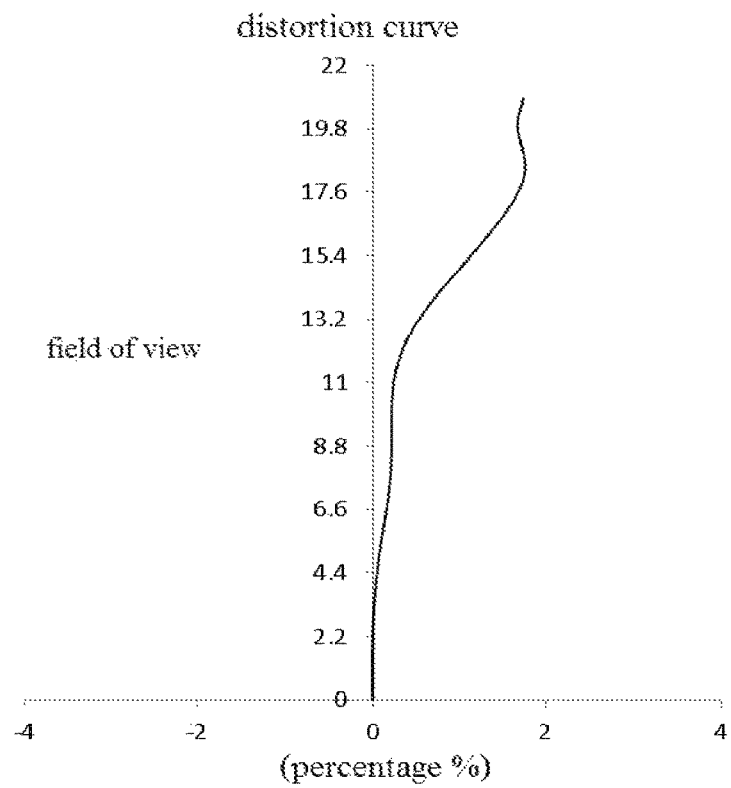
Figure 6D:
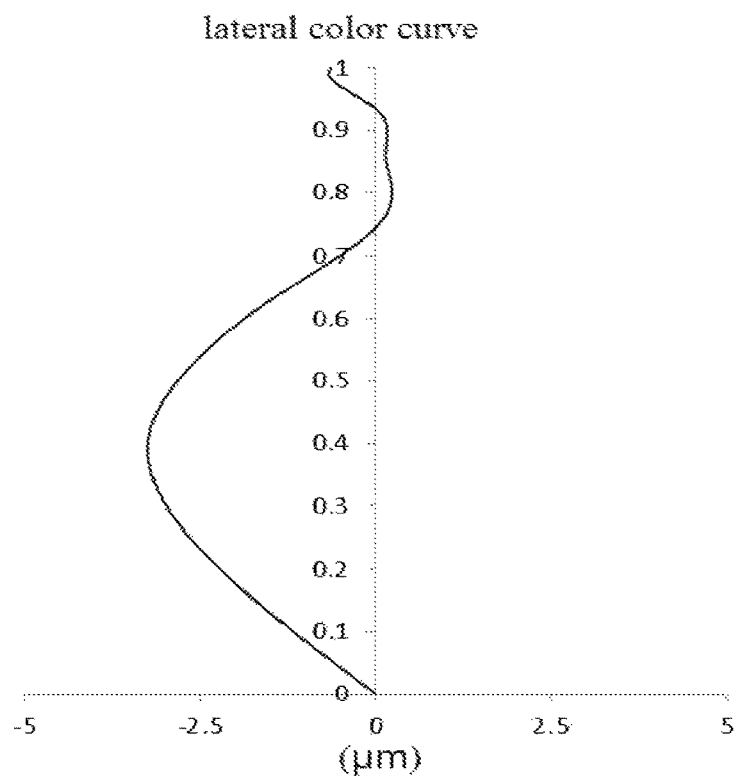

FIG. 6A illustrates a longitudinal aberration curve of the optical imaging lens assembly according to embodiment 3 to represent deviation of a convergence focal point after light with different wavelengths passes through the lens. FIG. 6B illustrates an astigmatism curve of the optical imaging lens assembly according to embodiment 3 to represent a tangential image surface curvature and a sagittal image surface curvature. FIG. 6C illustrates a distortion curve of the optical imaging lens assembly according to embodiment 3 to represent distortion values under different FOVs. FIG. 6D illustrates a lateral color curve of the optical imaging lens assembly according to embodiment 3 to represent deviation of different image heights on the imaging surface after the light passes through the lens. According to FIG. 6A to FIG. 6D, it can be seen that the optical imaging lens assembly provided in embodiment 3 achieves high imaging quality.

Embodiment 4

Figure 7:
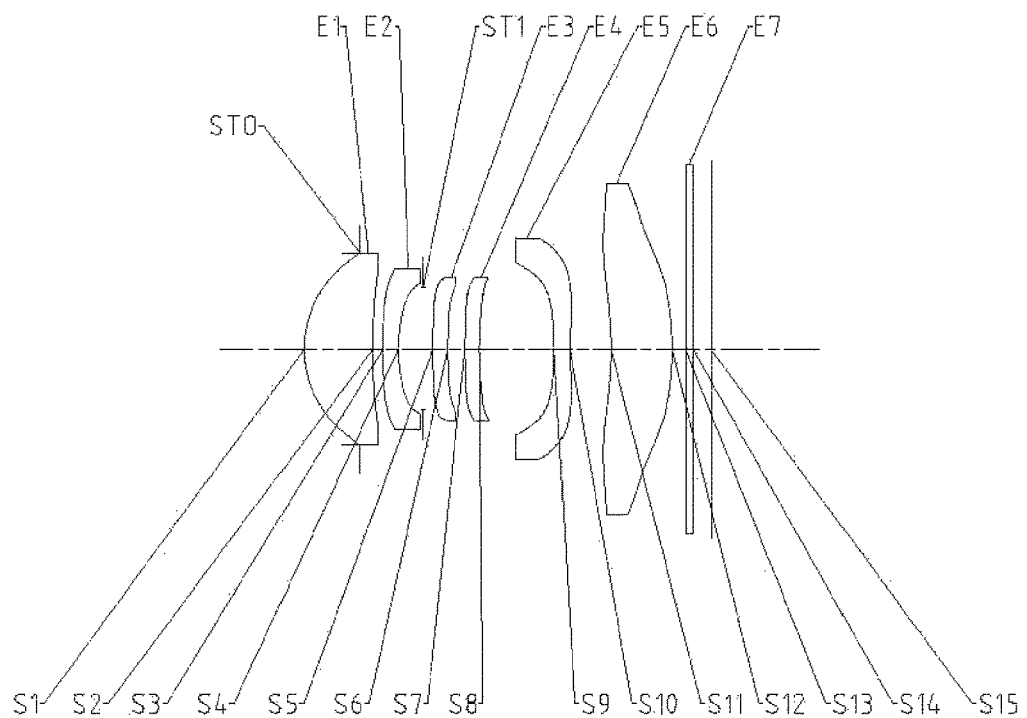
FIG. 7 is a structure diagram of an optical imaging lens assembly according to embodiment 4 of the disclosure.

An optical imaging lens assembly according to embodiment 4 of the disclosure will be described below with reference to FIG. 7 to FIG. 8D. FIG. 7 is a structure diagram of an optical imaging lens assembly according to embodiment 4 of the disclosure.

As shown in FIG. 7, the optical imaging lens assembly sequentially includes, from an object side to an image side along an optical axis, a diaphragm STO, a first lens E1, a second lens E2, a vignetting diaphragm ST1, a third lens E3, a fourth lens E4, a fifth lens E5, a sixth lens E6, an optical filter E7 and an imaging surface S15.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a negative refractive power, an object-side surface S5 thereof is a convex surface, while an image-side surface S6 is a concave surface. The fourth lens E4 has a negative refractive power, an object-side surface S7 thereof is a convex surface, while an image-side surface S8 is a concave surface. The fifth lens E5 has a negative refractive power, an object-side surface S9 thereof is a concave surface, while an image-side surface S10 is a concave surface. The sixth lens E6 has a positive refractive power, an object-side surface S11 thereof is a concave surface, while an image-side surface S12 is a convex surface. The optical filter E7 has an object-side surface S13 and an image-side surface S14. Light from an object sequentially penetrates through each of the surfaces S1 to S14 and is finally imaged on the imaging surface S15.

Table 7 is a basic parameter table of the optical imaging lens assembly of embodiment 4, and units of the radius of curvature, the thickness and the focal length are all millimeter (mm). Table 8 shows high-order coefficients applied to each aspherical mirror surface in embodiment 4. A surface type of each aspherical surface is defined by formula (1) given in embodiment 1.

TABLE 7

Embodiment 4: f = 6.82 mm, f/EPD = 2.53, Semi-FOV = 21.1°, ImgH = 2.67 mm

| Surface number | Surface type | Radius of curvature | Thickness | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7829 | | | | |
| S1 | Aspherical | 1.5011 | 0.9681 | 1.55 | 56.1 | 3.08 | −0.1552 |
| S2 | Aspherical | 10.8617 | 0.1384 | | | | −2.1745 |
| S3 | Aspherical | 6.3203 | 0.2246 | 1.68 | 19.2 | −5.90 | 22.2047 |
| S4 | Aspherical | 2.4126 | 0.3516 | | | | 3.5939 |
| ST1 | Spherical | Infinite | 0.1365 | | | | |
| S5 | Aspherical | 12.1159 | 0.2100 | 1.68 | 19.2 | −55.09 | 54.4049 |
| S6 | Aspherical | 9.0828 | 0.2413 | | | | 31.9331 |
| S7 | Aspherical | 10.3695 | 0.2100 | 1.55 | 56.1 | −23.71 | 95.0687 |
| S8 | Aspherical | 5.7163 | 1.0500 | | | | 22.4468 |
| S9 | Aspherical | −11.5264 | 0.2200 | 1.55 | 56.1 | −7.21 | 82.1546 |
| S10 | Aspherical | 6.0123 | 0.5822 | | | | −20.8356 |
| S11 | Aspherical | −5.1684 | 0.8664 | 1.67 | 20.3 | 27.68 | −56.2684 |
| S12 | Aspherical | −4.3078 | 0.1876 | | | | −10.0000 |
| S13 | Spherical | Infinite | 0.1100 | 1.52 | 64.2 | | |

TABLE 7-continued

Embodiment 4: f = 6.82 mm, f/EPD = 2.53, Semi-FOV = 21.1°, ImgH = 2.67 mm

| Surface number | Surface type | Radius of curvature | Thickness | Material Refractive index | Abbe number | Focal length | Conic coefficient |
|---|---|---|---|---|---|---|---|
| S14 | Spherical | Infinite | 0.1876 | | | | |
| S15 | Spherical | Infinite | 0.0647 | | | | |

TABLE 8

| Surface number | A4 | A6 | A8 | A10 | A12 |
|---|---|---|---|---|---|
| S1 | 6.7984E−03 | −1.3461E−02 | 6.7554E−02 | −1.6730E−01 | 2.5410E−01 |
| S2 | 1.2586E−02 | 1.2624E−02 | 1.1229E−02 | −4.5527E−02 | 1.8237E−02 |
| S3 | −4.4964E−02 | 1.5359E−01 | −3.2377E−01 | 1.0548E+00 | −2.5036E+00 |
| S4 | −6.7638E−02 | 2.8411E−01 | −9.1093E−01 | 2.7031E+00 | −1.3691E+00 |
| S5 | −3.2424E−02 | 1.6248E−02 | 2.3071E−01 | −2.2562E−01 | 1.9468E+00 |
| S6 | 3.2114E−02 | −6.7954E−02 | 9.6019E−02 | 1.6744E+00 | −3.9379E+00 |
| S7 | 5.7957E−02 | −4.1061E−01 | 7.0318E−01 | 4.1820E−01 | −3.0566E+00 |
| S8 | 4.3352E−02 | −4.6707E−01 | 1.8000E+00 | −6.0479E+00 | 1.5581E+01 |
| S9 | −1.3735E−01 | −7.1409E−02 | 8.6663E−02 | 3.0532E−02 | −3.1275E−01 |
| S10 | −8.1922E−02 | −7.4001E−02 | 1.6543E−01 | −1.7520E−01 | 1.0313E−01 |
| S11 | −1.5825E−02 | 1.2067E−04 | 1.3552E−02 | −7.0732E−03 | 1.3457E−03 |
| S12 | −2.9294E−02 | −3.0869E−03 | 1.9029E−03 | −1.4352E−04 | 9.0722E−04 |

| Surface number | A14 | A16 | A18 | A20 |
|---|---|---|---|---|
| S1 | −2.3420E−01 | 1.2685E−01 | −3.6446E−02 | 4.1085E−03 |
| S2 | 5.4693E−02 | −8.6556E−02 | 4.7733E−02 | −9.2464E−03 |
| S3 | 3.6649E+00 | −3.1926E+00 | 1.5055E+00 | −2.9271E−01 |
| S4 | −1.2283E+01 | 3.3753E+01 | −3.5742E+01 | 1.4177E+01 |
| S5 | −8.0384E+00 | 1.4573E+01 | −1.2892E+01 | 4.5522E+00 |
| S6 | 1.3710E+00 | 7.7641E+00 | −1.2698E+01 | 6.0050E+00 |
| S7 | 5.8759E+00 | −5.9240E+00 | 2.9632E+00 | −5.7122E−01 |
| S8 | −2.6050E+01 | 2.6517E+01 | −1.4814E+01 | 3.4528E+00 |
| S9 | 4.5268E−01 | −3.2698E−01 | 1.2027E−01 | −1.7479E−02 |
| S10 | −3.0796E−02 | 1.0515E−03 | 1.8174E−03 | −3.4127E−04 |
| S11 | 2.4113E−06 | −4.4264E−05 | 7.2034E−06 | −3.9171E−07 |
| S12 | −5.1816E−04 | 1.1289E−04 | −1.1014E−05 | 4.0099E−07 |

Figure 8A:
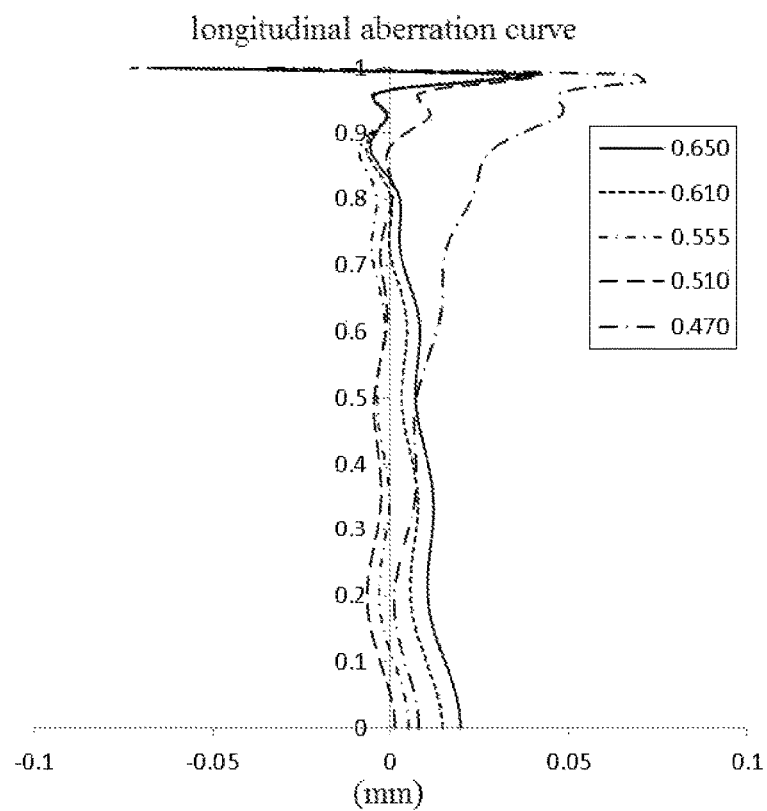
FIG. 8A to FIG. 8D illustrate a longitudinal aberration curve, astigmatism curve, distortion curve and lateral color curve of an optical imaging lens assembly according to embodiment 4 respectively.
Figure 8B:
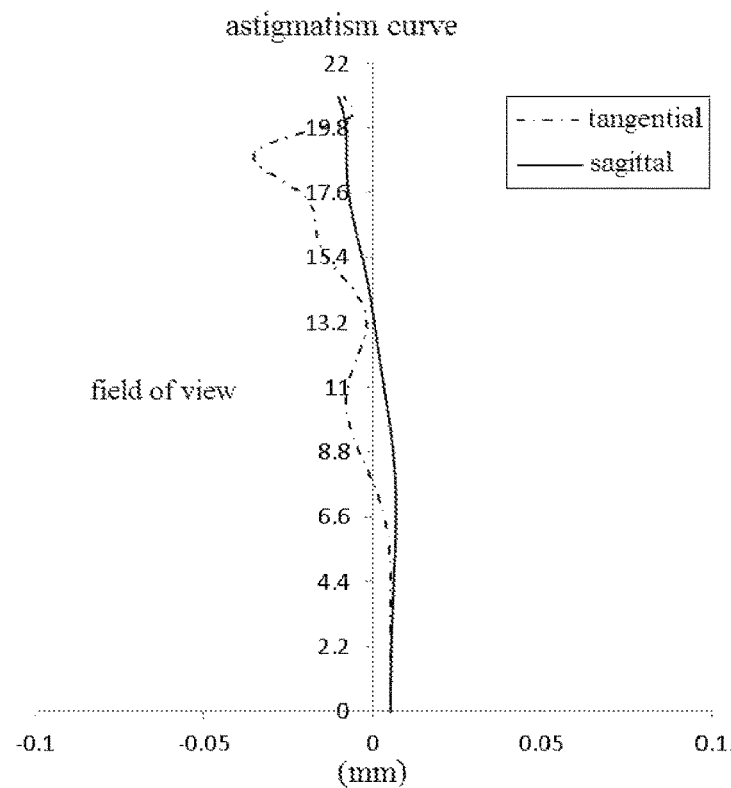
Figure 8C:
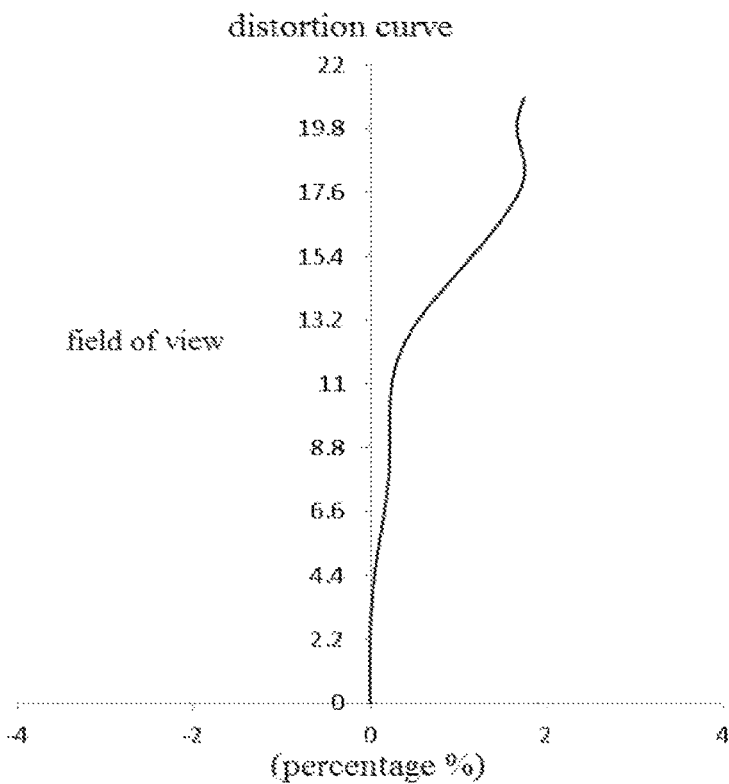
Figure 8D:
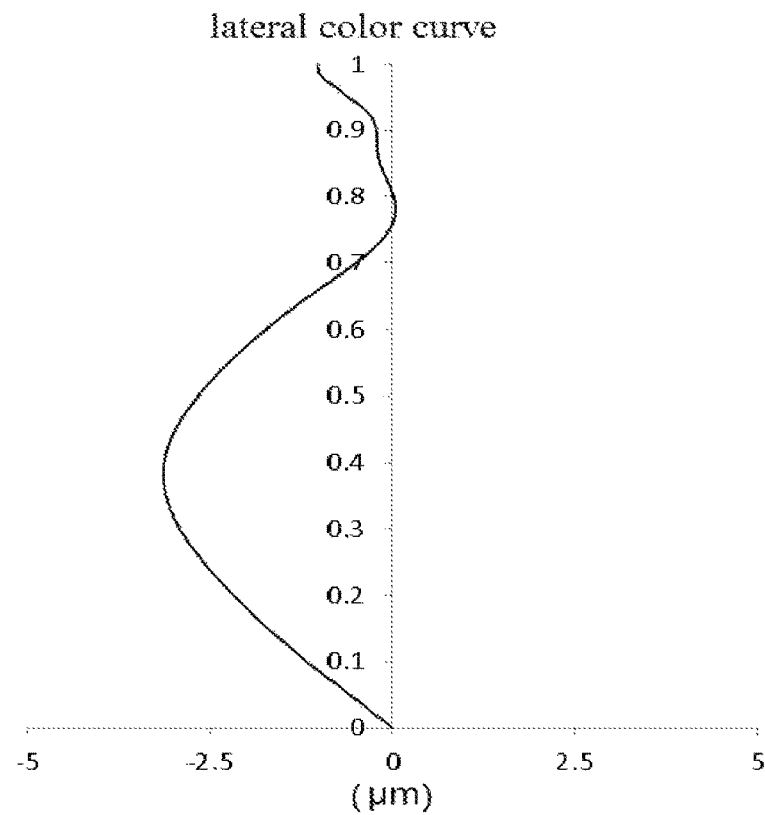

FIG. 8A illustrates a longitudinal aberration curve of the optical imaging lens assembly according to embodiment 4 to represent deviation of a convergence focal point after light with different wavelengths passes through the lens. FIG. 8B illustrates an astigmatism curve of the optical imaging lens assembly according to embodiment 4 to represent a tangential image surface curvature and a sagittal image surface curvature. FIG. 8C illustrates a distortion curve of the optical imaging lens assembly according to embodiment 4 to represent distortion values under different FOVs. FIG. 8D illustrates a lateral color curve of the optical imaging lens assembly according to embodiment 4 to represent deviation of different image heights on the imaging surface after the light passes through the lens. According to FIG. 8A to FIG. 8D, it can be seen that the optical imaging lens assembly provided in embodiment 4 achieves high imaging quality.

Embodiment 5

Figure 9:
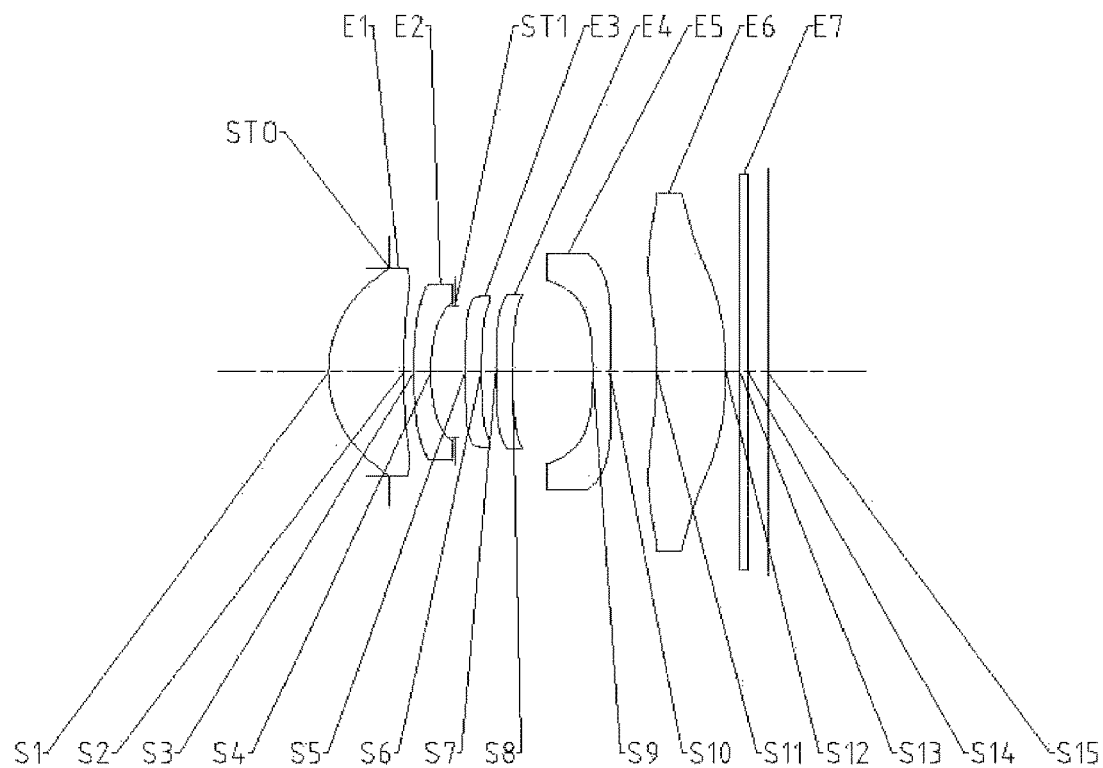
FIG. 9 is a structure diagram of an optical imaging lens assembly according to embodiment 5 of the disclosure.

An optical imaging lens assembly according to embodiment 5 of the disclosure will be described below with reference to FIG. 9 to FIG. 10D. FIG. 9 is a structure diagram of an optical imaging lens assembly according to embodiment 5 of the disclosure.

As shown in FIG. 9, the optical imaging lens assembly sequentially includes, from an object side to an image side along an optical axis, a diaphragm STO, a first lens E1, a second lens E2, a vignetting diaphragm ST1, a third lens E3, a fourth lens E4, a fifth lens E5, a sixth lens E6, an optical filter E7 and an imaging surface S15.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a negative refractive power, an object-side surface S7 thereof is a convex surface, while an image-side surface S8 is a concave surface. The fifth lens E5 has a negative refractive power, an object-side surface S9 thereof is a concave surface, while an image-side surface S10 is a concave surface. The sixth lens E6 has a positive refractive power, an object-side surface S11 thereof is a concave surface, while an image-side surface S12 is a convex surface. The optical filter E7 has an object-side surface S13 and an image-side surface S14. Light from an object sequentially penetrates through each of the surfaces S1 to S14 and is finally imaged on the imaging surface S15.

Table 9 is a basic parameter table of the optical imaging lens assembly of embodiment 5, and units of the radius of curvature, the thickness and the focal length are all millimeter (mm). Table 10 shows high-order coefficients applied to each aspherical mirror surface in embodiment 5. A surface type of each aspherical surface is defined by formula (1) given in embodiment 1.

Figure 10A:
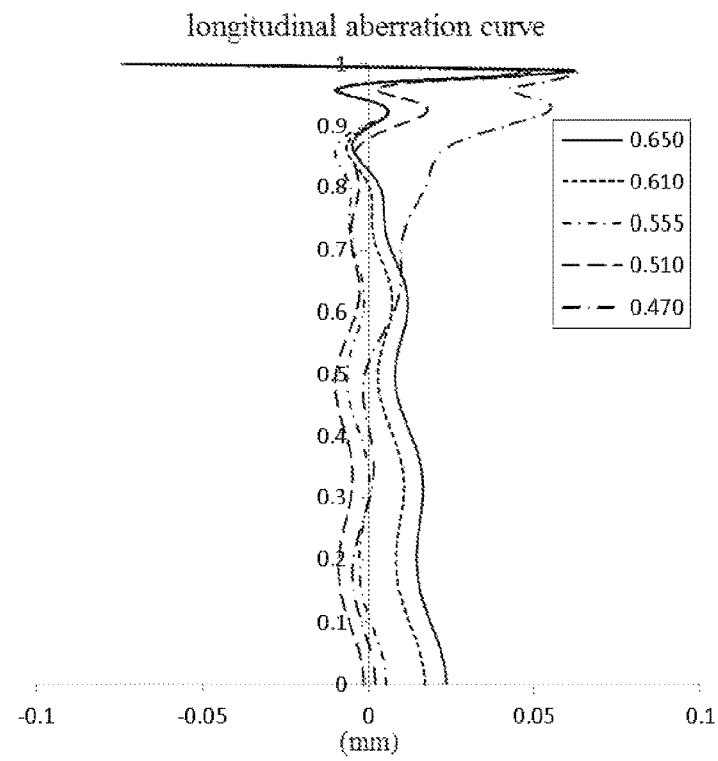
FIG. 10A to FIG. 10D illustrate a longitudinal aberration curve, astigmatism curve, distortion curve and lateral color curve of an optical imaging lens assembly according to embodiment 5 respectively.
Figure 10B:
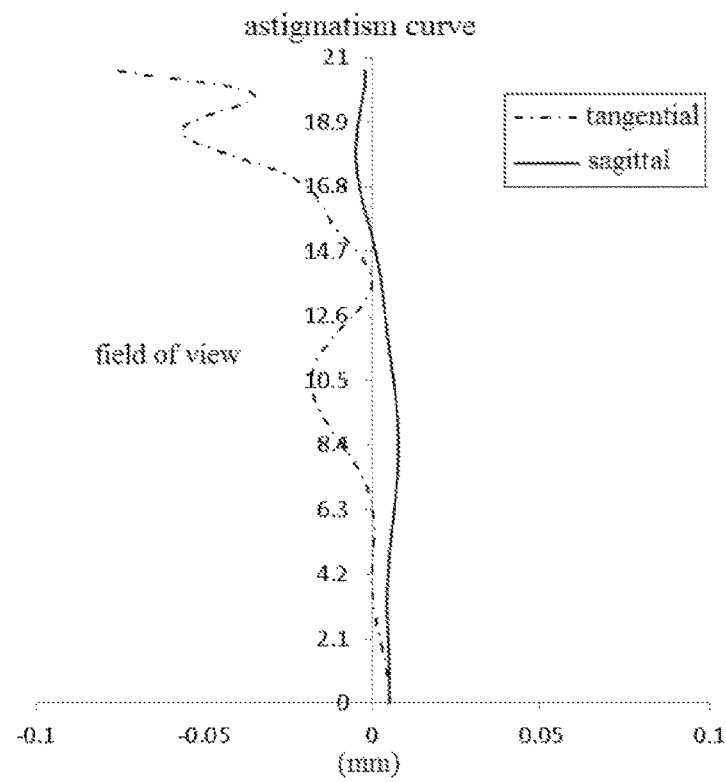

FIG. 10A illustrates a longitudinal aberration curve of the optical imaging lens assembly according to embodiment 5 to represent deviation of a convergence focal point after light with different wavelengths passes through the lens. FIG. 10B illustrates an astigmatism curve of the optical imaging lens assembly according to embodiment 5 to represent a tangential image surface curvature and a sagittal image

TABLE 9

Embodiment 5: f = 6.90 mm, f/EPD = 2.53, Semi-FOV = 20.8°, ImgH = 2.67 mm

| Surface number | Surface type | Radius of curvature | Thickness | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7965 | | | | |
| S1 | Aspherical | 0.6647 | 0.9865 | 1.55 | 56.1 | 3.08 | −0.1574 |
| S2 | Aspherical | 0.0914 | 0.1348 | | | | −3.3551 |
| S3 | Aspherical | 0.1568 | 0.2221 | 1.68 | 19.2 | −5.79 | 22.1238 |
| S4 | Aspherical | 0.4178 | 0.3151 | | | | 3.5027 |
| ST1 | Spherical | Infinite | 0.1365 | | | | |
| S5 | Aspherical | 0.0806 | 0.2100 | 1.68 | 19.2 | 350.07 | 41.1072 |
| S6 | Aspherical | 0.0769 | 0.1935 | | | | 45.1288 |
| S7 | Aspherical | 0.0975 | 0.2100 | 1.55 | 56.1 | −21.19 | 99.0000 |
| S8 | Aspherical | 0.1853 | 1.0500 | | | | 20.6547 |
| S9 | Aspherical | −0.0922 | 0.2200 | 1.55 | 56.1 | −6.19 | 78.9116 |
| S10 | Aspherical | 0.2021 | 0.6160 | | | | −48.1830 |
| S11 | Aspherical | −0.1914 | 0.9045 | 1.67 | 20.3 | 45.71 | −48.1711 |
| S12 | Aspherical | −0.2097 | 0.1876 | | | | −10.0000 |
| S13 | Spherical | Infinite | 0.1100 | 1.52 | 64.2 | | |
| S14 | Spherical | Infinite | 0.2523 | | | | |
| S15 | Spherical | Infinite | | | | | |

TABLE 10

| Surface number | A4 | A6 | A8 | A10 | A12 |
|---|---|---|---|---|---|
| S1 | 6.3321E−03 | −1.3248E−02 | 6.7100E−02 | −1.6753E−01 | 2.5576E−01 |
| S2 | 1.2668E−02 | 1.2192E−02 | 1.4848E−02 | −5.9067E−02 | 4.6325E−02 |
| S3 | −4.3979E−02 | 1.5343E−01 | −3.2889E−01 | 1.0676E+00 | −2.5126E+00 |
| S4 | −6.9154E−02 | 3.0515E−01 | −1.1450E+00 | 3.8320E+00 | −4.3403E+00 |
| S5 | −2.8999E−02 | −3.5846E−02 | 9.0377E−01 | −5.0779E+00 | 2.0592E+01 |
| S6 | 4.1443E−02 | −1.1213E−01 | 4.3938E−01 | −1.0456E+00 | 7.9390E+00 |
| S7 | 6.1531E−02 | −4.1558E−01 | 7.1731E−01 | 6.2751E−01 | −4.0312E+00 |
| S8 | 3.3584E−02 | −4.8658E−01 | 2.3114E+00 | −8.8145E+00 | 2.3724E+01 |
| S9 | −2.3928E−01 | 7.4467E−02 | 2.4358E−01 | −7.3208E−01 | 8.7840E−01 |
| S10 | −1.7016E−01 | 1.4083E−01 | −2.7433E−02 | −8.8200E−02 | 1.0532E−01 |
| S11 | −2.5318E−02 | −1.2607E−02 | 4.8862E−02 | −3.4571E−02 | 1.2657E−02 |
| S12 | −2.5686E−02 | −1.6579E−02 | 1.6303E−02 | −8.9221E−03 | 4.5454E−03 |

Figure 10C:
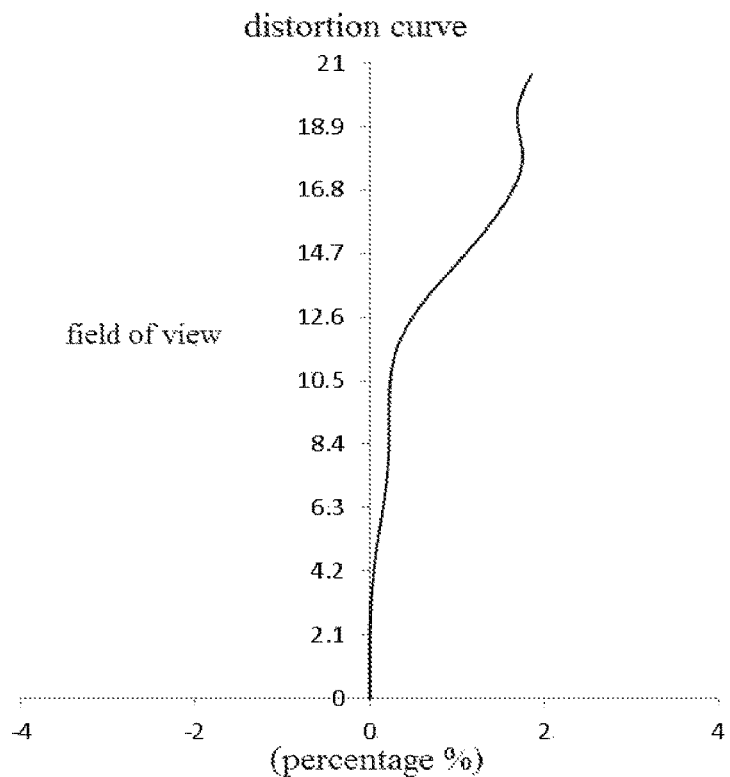
Figure 10D:
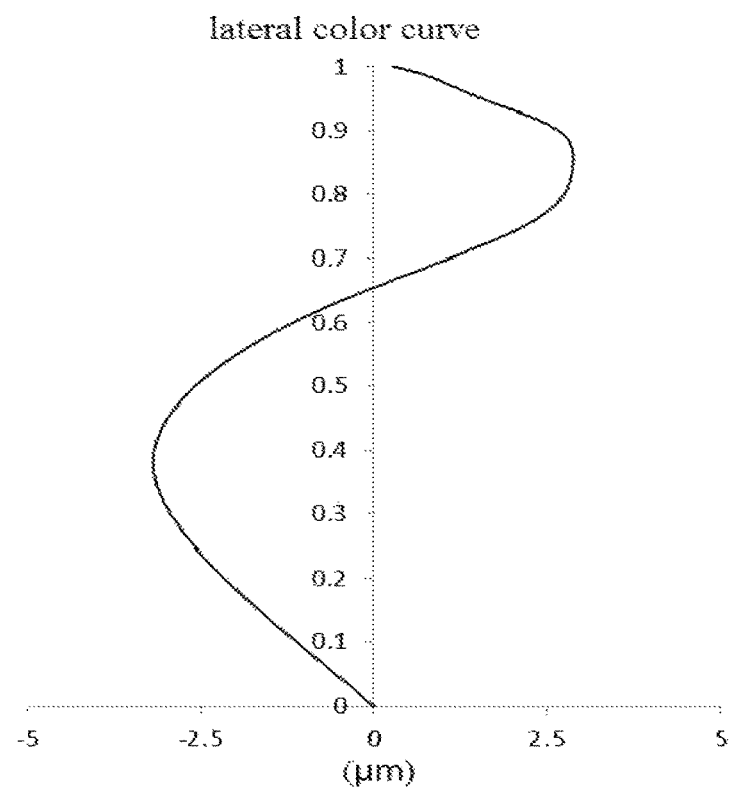

| Surface number | A14 | A16 | A18 | A20 |
|---|---|---|---|---|
| S1 | −2.3704E−01 | 1.2921E−01 | −3.7424E−02 | 4.2781E−03 |
| S2 | 1.9771E−02 | −6.0987E−02 | 3.7492E−02 | −7.5179E−03 |
| S3 | 3.6437E+00 | −3.1426E+00 | 1.4664E+00 | −2.8205E−01 |
| S4 | −7.9583E+00 | 3.0497E+01 | −3.4762E+01 | 1.4176E+01 |
| S5 | −4.9221E+01 | 6.7170E+01 | −4.8914E+01 | 1.4772E+01 |
| S6 | −2.8145E+01 | 4.9530E+01 | −4.3765E+01 | 1.5384E+01 |
| S7 | 7.3027E+00 | −6.4552E+00 | 2.5497E+00 | −2.9856E−01 |
| S8 | −4.0706E+01 | 4.2303E+01 | −2.4064E+01 | 5.7108E+00 |
| S9 | −5.9426E−01 | 2.0882E−01 | −2.6805E−02 | −8.4259E−04 |
| S10 | −6.1412E−02 | 2.0691E−02 | −3.7924E−03 | 2.8755E−04 |
| S11 | −2.7855E−03 | 3.7443E−04 | −2.8584E−05 | 9.5656E−07 |
| S12 | −1.5533E−03 | 3.0114E−04 | −3.0277E−05 | 1.2350E−06 | surface curvature. FIG. 10C illustrates a distortion curve of the optical imaging lens assembly according to embodiment 5 to represent distortion values under different FOVs. FIG. 10D illustrates a lateral color curve of the optical imaging lens assembly according to embodiment 5 to represent deviation of different image heights on the imaging surface after the light passes through the lens. According to FIG. 10A to FIG. 10D, it can be seen that the optical imaging lens assembly provided in embodiment 5 achieves high imaging quality.

Embodiment 6

Figure 11:
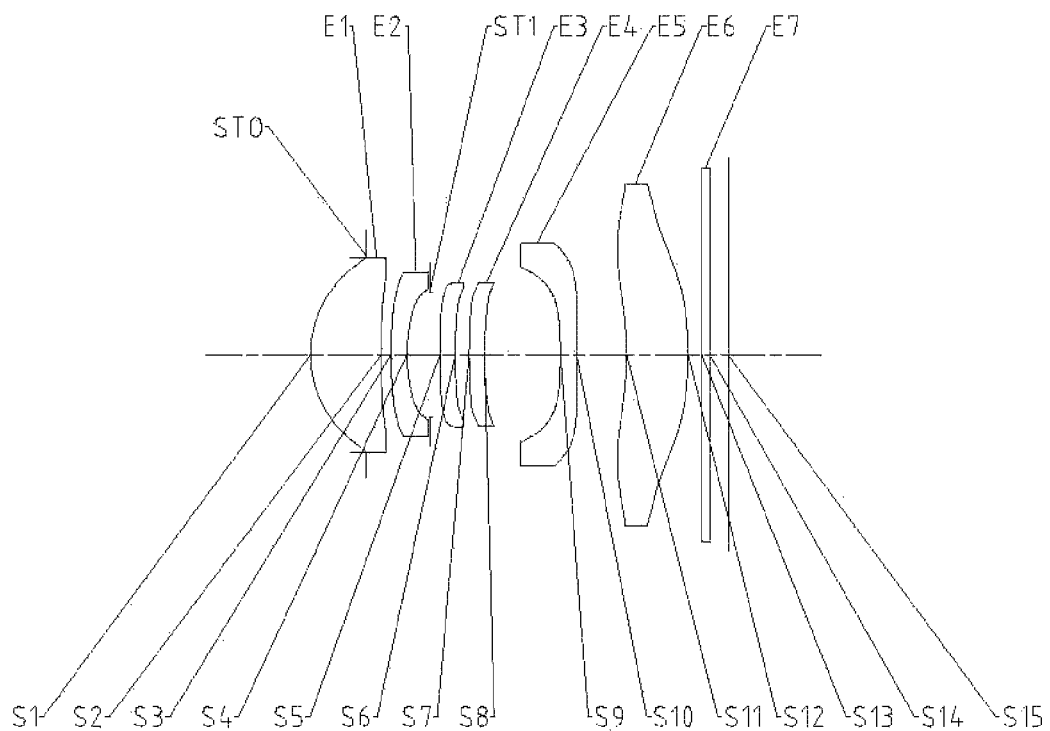
FIG. 11 is a structure diagram of an optical imaging lens assembly according to embodiment 6 of the disclosure.

An optical imaging lens assembly according to embodiment 6 of the disclosure will be described below with reference to FIG. 11 to FIG. 12D. FIG. 11 is a structure diagram of an optical imaging lens assembly according to embodiment 6 of the disclosure.

As shown in FIG. 11, the optical imaging lens assembly sequentially includes, from an object side to an image side along an optical axis, a diaphragm STO, a first lens E1, a second lens E2, a vignetting diaphragm ST1, a third lens E3, a fourth lens E4, a fifth lens E5, a sixth lens E6, an optical filter E7 and an imaging surface S15.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a negative refractive power, an object-side surface S7 thereof is a convex surface, while an image-side surface S8 is a concave surface. The fifth lens E5 has a negative refractive power, an object-side surface S9 thereof is a concave surface, while an image-side surface S10 is a concave surface. The sixth lens E6 has a negative refractive power, an object-side surface S11 thereof is a concave surface, while an image-side surface S12 is a convex surface. The optical filter E7 has an object-side surface S13 and an image-side surface S14. Light from an object sequentially penetrates through each of the surfaces S1 to S14 and is finally imaged on the imaging surface S15.

Table 11 is a basic parameter table of the optical imaging lens assembly of embodiment 6, and units of the radius of curvature, the thickness and the focal length are all millimeter (mm). Table 12 shows high-order coefficients applied to each aspherical mirror surface in embodiment 6. A surface type of each aspherical surface is defined by formula (1) given in embodiment 1.

TABLE 11

Embodiment 6: f = 6.90 mm, f/EPD = 2.57, Semi-FOV = 20.9°, ImgH = 2.67 mm

| Surface number | Surface type | Radius of curvature | Thickness | Refractive index | Abbe number | Focal length | Conic coefficient |
|---|---|---|---|---|---|---|---|
| OBJ | Spherical | Infinite | Infinite | | | | |
| STO | Spherical | Infinite | −0.7743 | | | | |
| S1 | Aspherical | 0.6648 | 0.9705 | 1.55 | 56.1 | 3.08 | −0.1558 |
| S2 | Aspherical | 0.0900 | 0.1369 | | | | −4.5643 |
| S3 | Aspherical | 0.1565 | 0.2193 | 1.68 | 19.2 | −5.71 | 22.4303 |
| S4 | Aspherical | 0.4210 | 0.3188 | | | | 3.5560 |
| ST1 | Spherical | Infinite | 0.1365 | | | | |
| S5 | Aspherical | 0.0811 | 0.2100 | 1.68 | 19.2 | 379.90 | 50.0057 |
| S6 | Aspherical | 0.0778 | 0.1919 | | | | 57.7075 |
| S7 | Aspherical | 0.0986 | 0.2100 | 1.55 | 56.1 | −20.61 | 98.9692 |
| S8 | Aspherical | 0.1889 | 1.0500 | | | | 20.6955 |
| S9 | Aspherical | −0.0959 | 0.2200 | 1.55 | 56.1 | −7.23 | 62.8676 |
| S10 | Aspherical | 0.1565 | 0.6882 | | | | −38.3419 |
| S11 | Aspherical | −0.2030 | 0.8469 | 1.67 | 20.3 | −1102.35 | −52.7062 |
| S12 | Aspherical | −0.1887 | 0.1876 | | | | −10.0000 |
| S13 | Spherical | Infinite | 0.1100 | 1.52 | 64.2 | | |
| S14 | Spherical | Infinite | 0.2523 | | | | |
| S15 | Spherical | Infinite | | | | | |

TABLE 12

| Surface number | A4 | A6 | A8 | A10 | A12 |
|---|---|---|---|---|---|
| S1 | 6.7735E−03 | −1.3292E−02 | 6.6219E−02 | −1.6322E−01 | 2.4669E−01 |
| S2 | 1.2508E−02 | 1.2424E−02 | −5.4599E−02 | 3.5974E−02 | |
| S3 | −4.3960E−02 | 1.5393E−01 | −3.3513E−01 | 1.1101E+00 | −2.6415E+00 |
| S4 | −6.7841E−02 | 2.8119E−01 | −9.3143E−01 | 2.8313E+00 | −1.6460E+00 |
| S5 | −2.6457E−02 | −6.0909E−02 | 8.4723E−01 | −3.6056E+00 | 1.3483E+01 |
| S6 | 3.6543E−02 | −6.0237E−02 | −8.1123E−02 | 2.5080E+00 | −5.4618E+00 |
| S7 | 4.7084E−02 | −3.1345E−01 | 4.2250E−01 | 1.2789E+00 | −5.3720E+00 |
| S8 | 1.9490E−02 | −3.9805E−01 | 2.0087E+00 | −8.4506E+00 | 2.4711E+01 |
| S9 | −2.1742E−01 | 1.5754E−01 | −1.0444E−01 | −8.3711E−02 | 1.2521E−01 |
| S10 | −1.7331E−01 | 1.8816E−01 | −1.1162E−01 | −5.8594E−02 | 1.5414E−01 |
| S11 | −5.9390E−02 | 4.9190E−02 | −1.5728E−02 | 6.2276E−03 | −3.2988E−03 |
| S12 | −4.2944E−02 | 3.4236E−03 | 1.2379E−02 | −1.6863E−02 | 1.1504E−02 |

TABLE 12-continued

| Surface number | A14 | A16 | A18 | A20 |
|---|---|---|---|---|
| S1 | −2.2562E−01 | 1.2078E−01 | −3.4120E−02 | 3.7394E−03 |
| S2 | 3.4601E−02 | −7.3661E−02 | 4.3428E−02 | −8.6764E−03 |
| S3 | 3.8606E+00 | −3.3506E+00 | 1.5736E+00 | −3.0501E−01 |
| S4 | −1.2215E+01 | 3.4448E+01 | −3.6817E+01 | 1.4685E+01 |
| S5 | −3.2374E+01 | 4.5521E+01 | −3.4526E+01 | 1.0896E+01 |
| S6 | 8.7032E−01 | 1.3994E+01 | −2.1170E+01 | 9.6360E+00 |
| S7 | 9.7770E+00 | −9.3202E+00 | 4.1733E+00 | −6.3155E−01 |
| S8 | −4.5384E+01 | 5.0220E+01 | −3.0367E+01 | 7.6542E+00 |
| S9 | −5.7373E−02 | −1.0613E−02 | 1.8790E−02 | −4.3831E−03 |
| S10 | −1.2530E−01 | 5.3437E−02 | −1.1816E−02 | 1.0579E−03 |
| S11 | 1.0872E−03 | −1.9132E−04 | 1.6903E−05 | −5.9031E−07 |
| S12 | −4.1381E−03 | 8.0675E−04 | −8.1135E−05 | 3.3083E−06 |

Figure 12A:
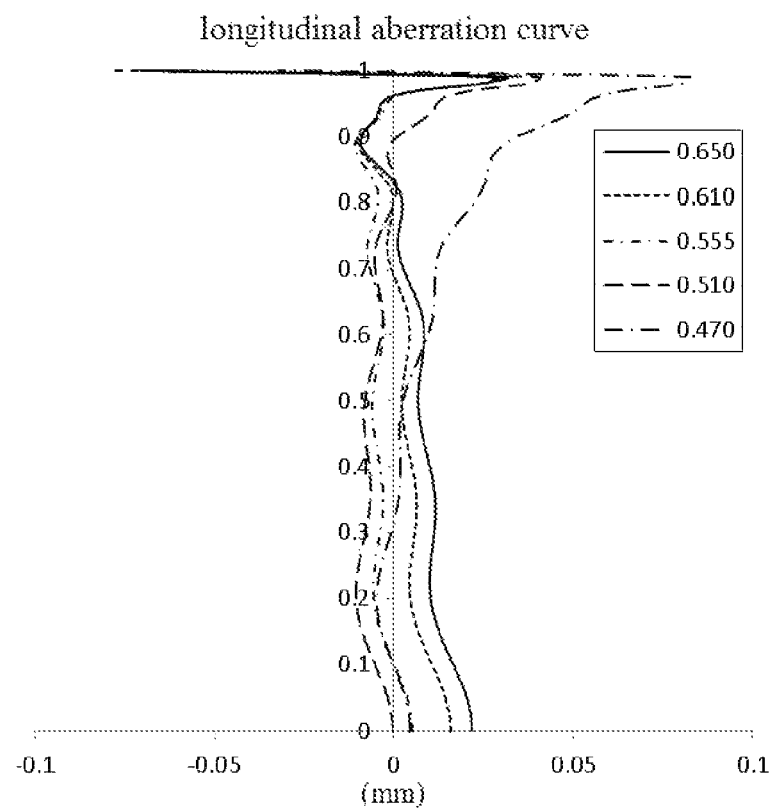
FIG. 12A to FIG. 12D illustrate a longitudinal aberration curve, astigmatism curve, distortion curve and lateral color curve of an optical imaging lens assembly according to embodiment 6 respectively.
Figure 12B:
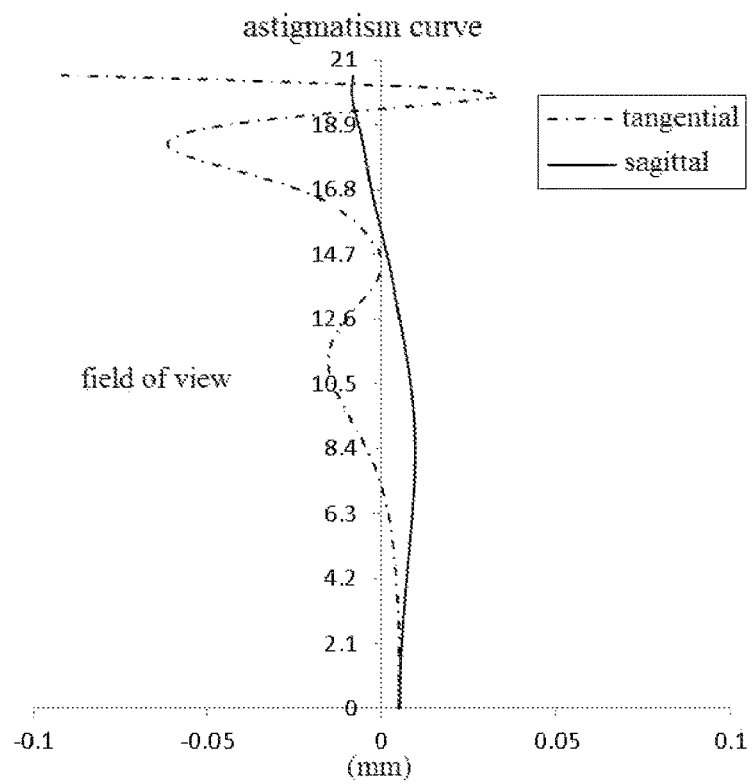
Figure 12C:
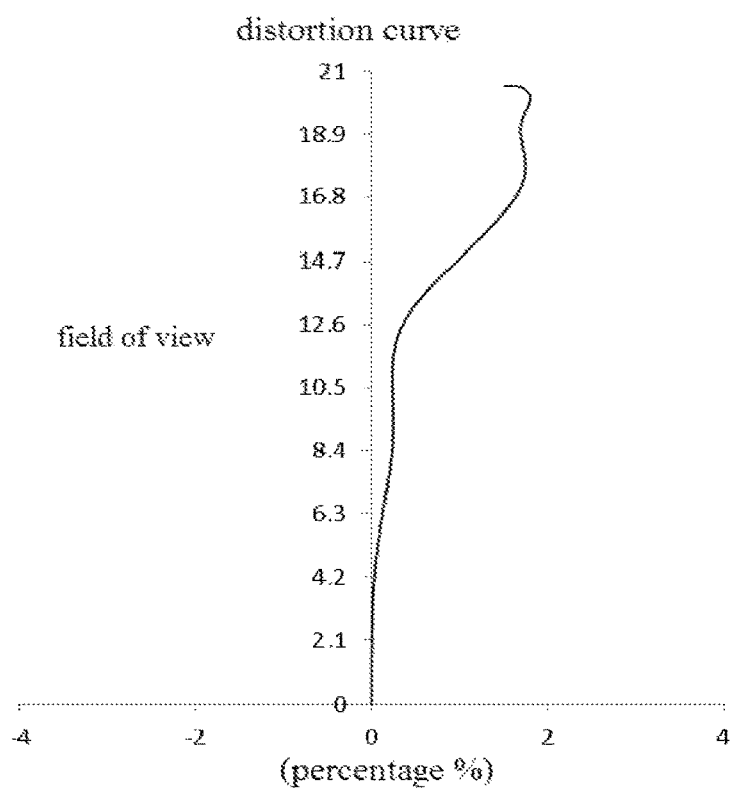
Figure 12D:
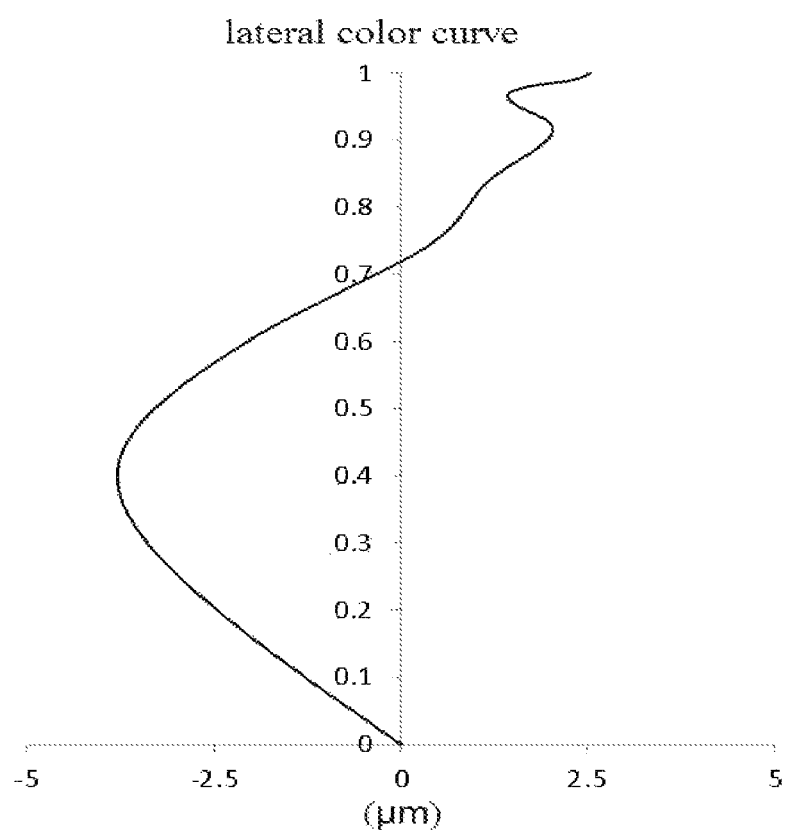

FIG. 12A illustrates a longitudinal aberration curve of the optical imaging lens assembly according to embodiment 6 to represent deviation of a convergence focal point after light with different wavelengths passes through the lens. FIG. 12B illustrates an astigmatism curve of the optical imaging lens assembly according to embodiment 6 to represent a tangential image surface curvature and a sagittal image surface curvature. FIG. 12C illustrates a distortion curve of the optical imaging lens assembly according to embodiment 6 to represent distortion values under different FOVs. FIG. 12D illustrates a lateral color curve of the optical imaging lens assembly according to embodiment 6 to represent deviation of different image heights on the imaging surface after the light passes through the lens. According to FIG. 12A to FIG. 12D, it can be seen that the optical imaging lens assembly provided in embodiment 6 achieves high imaging quality.

From the above, embodiment 1 to embodiment 6 meet a relationship shown in Table 13 respectively.

TABLE 13

| Conditional expression/ embodiment | 1 | 2 | 3 | 4 | 5 | 6 |
|---|---|---|---|---|---|---|
| TTL/f | 0.85 | 0.84 | 0.84 | 0.84 | 0.83 | 0.83 |
| Semi-FOV(°) | 21.3 | 21.0 | 21.1 | 21.1 | 20.8 | 20.9 |
| f1/f | 0.46 | 0.45 | 0.45 | 0.45 | 0.45 | 0.45 |
| (f3 + f2)/(f3 − f2) | 1.16 | 1.23 | 1.24 | 1.24 | 0.97 | 0.97 |
| f/(f5 − f4) | 0.33 | 0.38 | 0.40 | 0.41 | 0.46 | 0.52 |
| f1234/f56 | −0.58 | −0.62 | −0.50 | −0.47 | −0.65 | −0.68 |
| (R3 + R4)/(R1 + R2) | 0.73 | 0.72 | 0.71 | 0.71 | 0.70 | 0.69 |
| R6/R5 | 0.81 | 0.75 | 0.74 | 0.75 | 1.05 | 1.04 |
| (R7 − R8)/(R7 + R8) | 0.28 | 0.30 | 0.29 | 0.29 | 0.31 | 0.31 |
| R12/R9 | 0.39 | 0.45 | 0.37 | 0.37 | 0.44 | 0.51 |
| CT1/(CT5 + CT6) | 0.79 | 0.88 | 0.89 | 0.89 | 0.88 | 0.91 |
| T12/T34 | 0.52 | 0.54 | 0.56 | 0.57 | 0.70 | 0.71 |
| T56/(T23 + T45) | 0.39 | 0.36 | 0.37 | 0.38 | 0.41 | 0.46 |
| SAG52/SAG62 | 0.51 | 0.57 | 0.59 | 0.67 | 0.46 | 0.54 |
| ET1/ET5 | 0.75 | 0.65 | 0.73 | 0.76 | 0.61 | 0.65 |
| (DT31 + DT61)/ΣAT | 1.30 | 1.32 | 1.31 | 1.30 | 1.33 | 1.29 |

Some embodiments of the disclosure also provide an imaging device, of which an electronic photosensitive element may be a Charge-Coupled Device (CCD) or a Complementary Metal Oxide Semiconductor (CMOS). The imaging device may be an independent imaging device such as a digital camera, and may also be an imaging module integrated into a mobile electronic device such as a mobile phone. The imaging device is provided with the abovementioned optical imaging lens assembly.

The above description is only description about some embodiments of the disclosure and adopted technical principles. It is understood by those skilled in the art that the scope of disclosure involved in the disclosure is not limited to the technical solutions formed by specifically combining the technical characteristics and should also cover other technical solutions formed by freely combining the technical characteristics or equivalent characteristics thereof without departing from the inventive concept, for example, technical solutions formed by mutually replacing the characteristics and (but not limited to) the technical characteristics with similar functions disclosed in the disclosure.

What is claimed is:

1. An optical imaging lens assembly, sequentially comprising a first lens, a second lens, a third lens, a fourth lens, a fifth lens and a sixth lens with refractive powers, from an object side to an image side along an optical axis, wherein
   the first lens has a positive refractive power, and an image-side surface of the first lens is a concave surface;
   the second lens has a negative refractive power;
   the fifth lens has a negative refractive power, and an object-side surface of the fifth lens is a concave surface; and
   a distance TTL from an object-side surface of the first lens to an imaging surface of the optical imaging lens assembly on the optical axis and a total effective focal length f of the optical imaging lens assembly satisfy TTL/f≤0.85;
   wherein an axial distance SAG52 from an intersection point of an image-side surface of the fifth lens and the optical axis to an effective radius vertex of the image-side surface of the fifth lens and an axial distance SAG62 from an intersection point of an image-side surface of the sixth lens and the optical axis to an effective radius vertex of the image-side surface of the sixth lens satisfy 0.3<SAG52/SAG62<0.8.

2. The optical imaging lens assembly according to claim 1, wherein an effective focal length f2 of the second lens and an effective focal length f3 of the third lens satisfy 0.9<(f3+f2)/(f3−f2)<1.4.

3. The optical imaging lens assembly according to claim 1, wherein an effective focal length f1 of the first lens and the total effective focal length f of the optical imaging lens assembly satisfy 0.2<f1/f<0.7.

4. The optical imaging lens assembly according to claim 1, wherein the total effective focal length f of the optical imaging lens assembly, an effective focal length f4 of the fourth lens and an effective focal length f5 of the fifth lens satisfy 0.2<f/(f5−f4)<0.7.

5. The optical imaging lens assembly according to claim 4, wherein a combined focal length f1234 of the first lens, the second lens, the third lens and the fourth lens and a combined focal length f56 of the fifth lens and the sixth lens satisfy $-0.8<f1234/f56<-0.3$.

6. The optical imaging lens assembly according to claim 1, wherein a radius of curvature R1 of an object-side surface of the first lens, a radius of curvature R2 of the image-side surface of the first lens, a radius of curvature R3 of an object-side surface of the second lens and a radius of curvature R4 of an image-side surface of the second lens satisfy $0.3<(R3+R4)/(R1+R2)<0.8$.

7. The optical imaging lens assembly according to claim 1, wherein a radius of curvature R5 of an object-side surface of the third lens and a radius of curvature R6 of an image-side surface of the third lens satisfy $0.7<R6/R5<1.2$.

8. The optical imaging lens assembly according to claim 1, wherein a radius of curvature R7 of an object-side surface of the fourth lens and a radius of curvature R8 of an image-side surface of the fourth lens satisfy $0.1<(R7-R8)/(R7+R8)<0.6$.

9. The optical imaging lens assembly according to claim 1, wherein a radius of curvature R9 of the object-side surface of the fifth lens and a radius of curvature R12 of an image-side surface of the sixth lens satisfy $0.2<R12/R9<0.7$.

10. The optical imaging lens assembly according to claim 1, wherein a center thickness CT1 of the first lens on the optical axis, a center thickness CT5 of the fifth lens on the optical axis and a center thickness CT6 of the sixth lens on the optical axis satisfy $0.5<CT1/(CT5+CT6)<1$.

11. The optical imaging lens assembly according to claim 1, wherein a spacing distance T12 of the first lens and the second lens on the optical axis and a spacing distance T34 of the third lens and the fourth lens on the optical axis satisfy $0.5<T12/T34<1$.

12. The optical imaging lens assembly according to claim 1, wherein a spacing distance T23 of the second lens and the third lens on the optical axis, a spacing distance T45 of the fourth lens and the fifth lens on the optical axis and a spacing distance T56 of the fifth lens and the sixth lens on the optical axis satisfy $0.1<T56/(T23+T45)<0.6$.

13. The optical imaging lens assembly according to claim 1, wherein an edge thickness ET1 of the first lens and an edge thickness ET5 of the fifth lens satisfy $0.5<ET1/ET5<0.8$.

14. The optical imaging lens assembly according to claim 1, wherein a maximum Semi-Field Of View (Semi-FOV) of the optical imaging lens assembly satisfies $0°<Semi-FOV<25°$.

15. The optical imaging lens assembly according to claim 1, wherein an object-side surface of the fourth lens is a convex surface, while an image-side surface is a concave surface.

16. The optical imaging lens assembly according to claim 15, wherein an image-side surface of the fifth lens is a concave surface.

17. The optical imaging lens assembly according to claim 16, wherein an object-side surface of the sixth lens is a concave surface.

18. An optical imaging lens assembly, sequentially comprising a first lens, a second lens, a third lens, a fourth lens, a fifth lens and a sixth lens with refractive powers, from an object side to an image side along an optical axis, wherein
the first lens has a positive refractive power, and an image-side surface of the first lens is a concave surface;
the second lens has a negative refractive power;
the fifth lens has a negative refractive power, and an object-side surface of the fifth lens is a concave surface; and
a distance TTL from an object-side surface of the first lens to an imaging surface of the optical imaging lens assembly on the optical axis and a total effective focal length f of the optical imaging lens assembly satisfy $TTL/f≤0.85$;
wherein a maximum effective radius DT31 of an object-side surface of the third lens, a maximum effective radius DT61 of an object-side surface of the sixth lens and a sum $\Sigma AT$ of a spacing distance of any two adjacent lenses in the first lens to the sixth lens on the optical axis satisfy $1.2<(DT31+DT61)/\Sigma AT<1.4$.

\* \* \* \* \*